(12) United States Patent
Kikuchi et al.

(10) Patent No.: US 11,516,358 B2
(45) Date of Patent: Nov. 29, 2022

(54) IMAGE FORMING APPARATUS, METHOD OF CONTROLLING THE SAME, AND MEDIUM

(71) Applicant: CANON KABUSHIKI KAISHA, Tokyo (JP)

(72) Inventors: Shou Kikuchi, Chiba (JP); Hiroyuki Toriyabe, Chiba (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 0 days.

(21) Appl. No.: 17/377,517

(22) Filed: Jul. 16, 2021

(65) Prior Publication Data
US 2022/0053104 A1 Feb. 17, 2022

(30) Foreign Application Priority Data
Aug. 13, 2020 (JP) .............................. JP2020-136729

(51) Int. Cl.
*H04N 1/00* (2006.01)
(52) U.S. Cl.
CPC ..... *H04N 1/00649* (2013.01); *H04N 1/00005* (2013.01); *H04N 1/0009* (2013.01); *H04N 1/00037* (2013.01); *H04N 1/0057* (2013.01); *H04N 1/00082* (2013.01)

(58) Field of Classification Search
None
See application file for complete search history.

(56) References Cited

U.S. PATENT DOCUMENTS

| 2018/0288236 A1* | 10/2018 | Tomii | H04N 1/00082 |
| 2019/0356816 A1* | 11/2019 | Matsuo | H04N 1/6033 |
| 2020/0007711 A1* | 1/2020 | Kamihara | H04N 1/00068 |

FOREIGN PATENT DOCUMENTS

JP 6340920 B2 6/2018

* cited by examiner

*Primary Examiner* — Frantz Bataille
(74) *Attorney, Agent, or Firm* — Rossi, Kimms & McDowell LLP

(57) ABSTRACT

An image forming apparatus is provided. the apparatus comprises a sheet feeding unit to supply a plurality of types of sheets; an image forming unit to form an image on a sheet; a detection unit to detect an image formed on the sheet; and a controller that causes correction information for each sheet type to be saved in a storage, and under set conditions, causes a specified type of sheet to be supplied by the sheet feeding unit, causes a chart for gradation correction to be formed by the image forming unit, and causes the correction information to be generated based on image information for which the formed chart for gradation correction was detected by the detection unit, and saves the correction information in the storage.

16 Claims, 20 Drawing Sheets

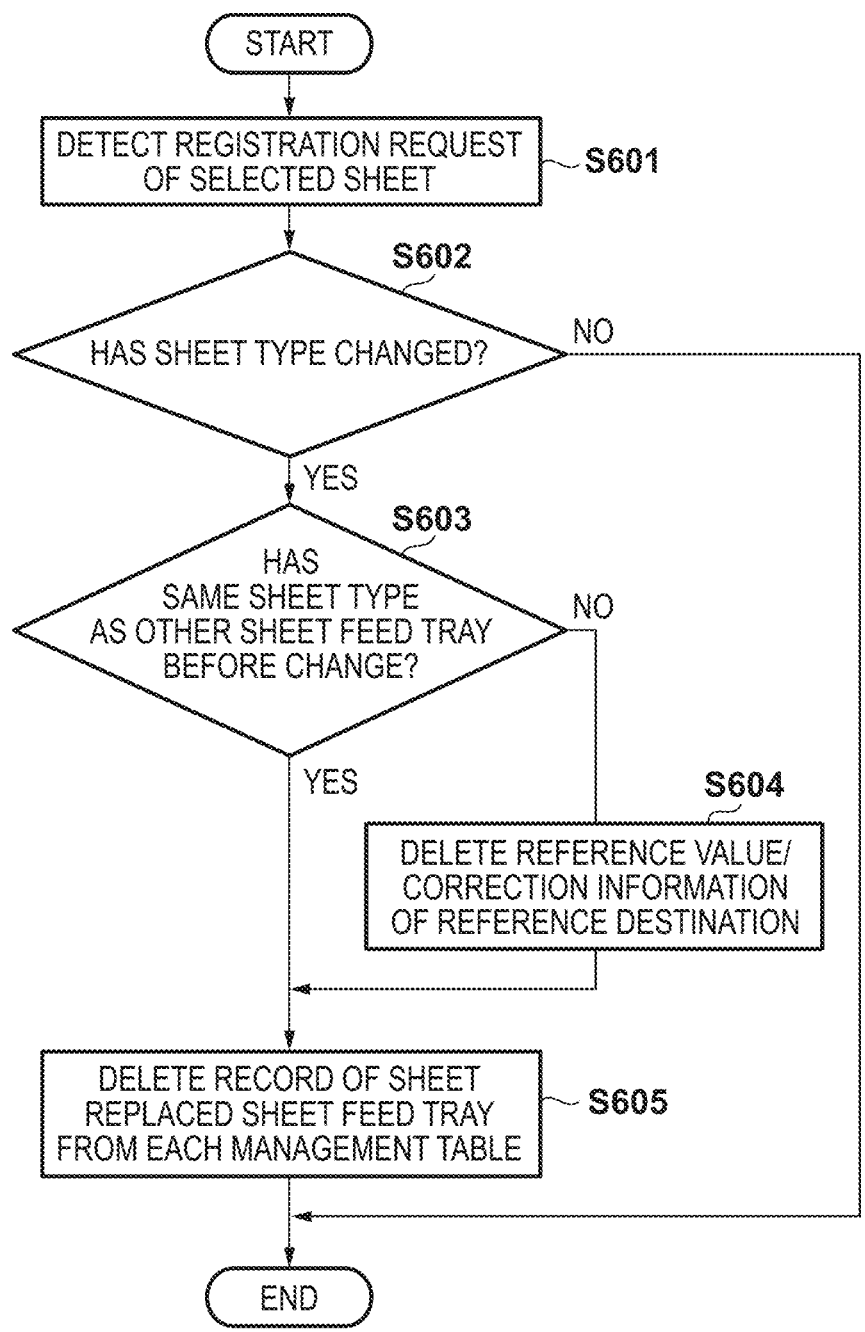

■ SELECTED SHEET INFORMATION
▶ A4 PLAIN PAPER 1 (70 g/m²)

705 — SET

| SHEET NAME | GRAMMAGE |
|---|---|
| THIN PAPER 1 | 55 g/m² |
| THIN PAPER 2 | 60 g/m² |
| PLAIN PAPER 1 | 70 g/m² |
| PLAIN PAPER 2 | 80 g/m² |
| PLAIN PAPER 3 | 100 g/m² |
| THICK PAPER 1 | 120 g/m² |
| THICK PAPER 2 | 140 g/m² |
| COATED PAPER 1 | 200 g/m² |
| COATED PAPER 2 | 240 g/m² |
| COATED PAPER 3 | 260 g/m² |

707 — PLAIN PAPER 3 row

CANCEL    708 — OK

881 — REFERENCE VALUE

| DEN-SITY | 100 | 90 | 80 | 70 | 60 | 50 | 40 | 30 | 20 | 10 |
|---|---|---|---|---|---|---|---|---|---|---|
| C | 1022 | 922 | 819 | 717 | 617 | 512 | 405 | 307 | 205 | 102 |
| M | 1020 | 923 | 820 | 717 | 615 | 513 | 412 | 309 | 210 | 103 |
| Y | 1016 | 921 | 819 | 717 | 614 | 512 | 410 | 305 | 205 | 99 |
| K | 1023 | 920 | 820 | 713 | 611 | 510 | 408 | 307 | 207 | 100 |

882 — MEASUREMENT VALUE

| DEN-SITY | 100 | 90 | 80 | 70 | 60 | 50 | 40 | 30 | 20 | 10 |
|---|---|---|---|---|---|---|---|---|---|---|
| C | 1018 | 921 | 822 | 719 | 620 | 520 | 401 | 307 | 203 | 100 |
| M | 1010 | 920 | 815 | 723 | 615 | 523 | 422 | 311 | 214 | 100 |
| Y | 1005 | 923 | 824 | 710 | 619 | 512 | 411 | 309 | 207 | 110 |
| K | 1020 | 915 | 815 | 700 | 601 | 512 | 405 | 302 | 205 | 95 |

883 — CORRECTION VALUE

| DEN-SITY | 100 | 90 | 80 | 70 | 60 | 50 | 40 | 30 | 20 | 10 |
|---|---|---|---|---|---|---|---|---|---|---|
| C | 4 | 1 | -3 | -2 | -3 | -8 | 4 | 0 | 2 | 2 |
| M | 10 | 3 | 5 | -6 | 0 | -10 | -10 | -2 | -4 | 3 |
| Y | 11 | -2 | -5 | 7 | -5 | 0 | -1 | -4 | -2 | -11 |
| K | 3 | 5 | 5 | 13 | 10 | -2 | 3 | 5 | 2 | 5 |

FIG. 8D

| SHEET TYPE | TARGETED SHEET FEED TRAY | REFERENCE VALUE (1/2 SPEED) | REFERENCE VALUE (1/1 SPEED) | GENERATE PageID | Timestamp |
|---|---|---|---|---|---|
| 891 | 892 | 893 | 894 | 895 | 896 |
| PLAIN PAPER 3 | CST1 | NULL | YES TBL 881 | 60014 | 2019/07/18 10:04:06 |
| COATED PAPER 1 | CST4 | NULL | NULL | NULL | NULL |

FIG. 8E

| SHEET TYPE | TARGETED SHEET FEED TRAY | CORRECTION VALUE (1/2 SPEED) | CORRECTION VALUE (1/1 SPEED) | GENERATE PageID | Timestamp |
|---|---|---|---|---|---|
| 897 | 898 | 899 | | | |
| PLAIN PAPER 3 | CST1 | NULL | YES TBL 883 | 640015 | 2019/07/18 18:34:21 |
| COATED PAPER 1 | CST4 | NULL | NULL | NULL | NULL |

IMAGE FORMING APPARATUS, METHOD OF CONTROLLING THE SAME, AND MEDIUM

BACKGROUND OF THE INVENTION

Field of the Invention

The present invention relates to a technique for preventing color variance arising during a print job.

Description of the Related Art

Some image forming apparatuses have a function for preventing image quality variance when mass printing. One such technique is to form a chart including a patch for gradation correction in the margin of a sheet and measure the patch with a color measurement sensor. A correction value for gradation correction is created based on color measurement value, the correction value is fed back to the image generating unit, and gradation correction of the subsequent page is performed. As an example of such a technique, Japanese Patent No. 6340920 discloses a technique for holding a reference value and a correction value for correcting image quality variance in each job to prevent variance within the jobs. For this reason, in Japanese Patent No. 6340920, the reference value and the correction value used for the gradation correction are managed in each print job.

In a case where a plurality of pages of sheets on which images were formed are combined into a document, a plurality of types of sheets within one print job may be used for forming images, for example. In such cases, a quality required by the user may differ depending on the type of sheet. However, in Japanese Patent No. 6340920, there is no consideration of using a plurality of types of sheets or image qualities in one such job.

SUMMARY OF THE INVENTION

By the present invention forming a chart for gradation correction in accordance with image quality compatible with the type of sheet, an image of higher quality is formed.

According to one aspect of the present invention, there is provided an image forming apparatus comprising: a sheet feeding unit configured to be able to supply a plurality of types of sheets; an image forming unit configured to form an image on a sheet supplied by the sheet feeding unit; a detection unit configured to detect an image formed on the sheet; and a controller configured to include at least one memory in which a program is stored and at least one processor, wherein, by the program being executed by the processor, the controller causes correction information for each sheet type to be saved in a storage, and under set conditions, causes a specified type of sheet to be supplied by the sheet feeding unit, causes a chart for gradation correction to be formed by the image forming unit, and causes the correction information to be generated based on image information for which the formed chart for gradation correction was detected by the detection unit, and saves the correction information in the storage.

By the present invention forming a chart for gradation correction in accordance with image quality compatible with the type of sheet, an image of higher quality can be formed.

Further features of the present invention will become apparent from the following description of exemplary embodiments with reference to the attached drawings.

BRIEF DESCRIPTION OF THE DRAWINGS

FIG. 6A and FIG. 6B are flowcharts of deletion processing and registration processing of a reference value/correction value.

FIG. 7A and FIG. 7B are screen transition views of a sheet replacement screen (a sheet feed tray selection screen and a sheet type selection screen).

FIG. 8C is a view for illustrating a sample of a reference value, a measurement value, and a correction value for gradation correction (3 plain papers).

FIG. 8D is a view for illustrating an example of a reference value management table for gradation correction.

FIG. 8E is a view for illustrating an example of a correction value management table.

DESCRIPTION OF THE EMBODIMENTS

Hereinafter, embodiments will be described in detail with reference to the attached drawings. Note, the following embodiments are not intended to limit the scope of the claimed invention. Multiple features are described in the embodiments, but limitation is not made to an invention that requires all such features, and multiple such features may be combined as appropriate. Furthermore, in the attached draw-

First Embodiment

An example in which a color chart for gradation correction is printed on a specified type of sheet each time the number of printed pages reaches a predetermined number (predetermined threshold value) during execution of a print job is described as a first embodiment.

Configuration

Figure 1:
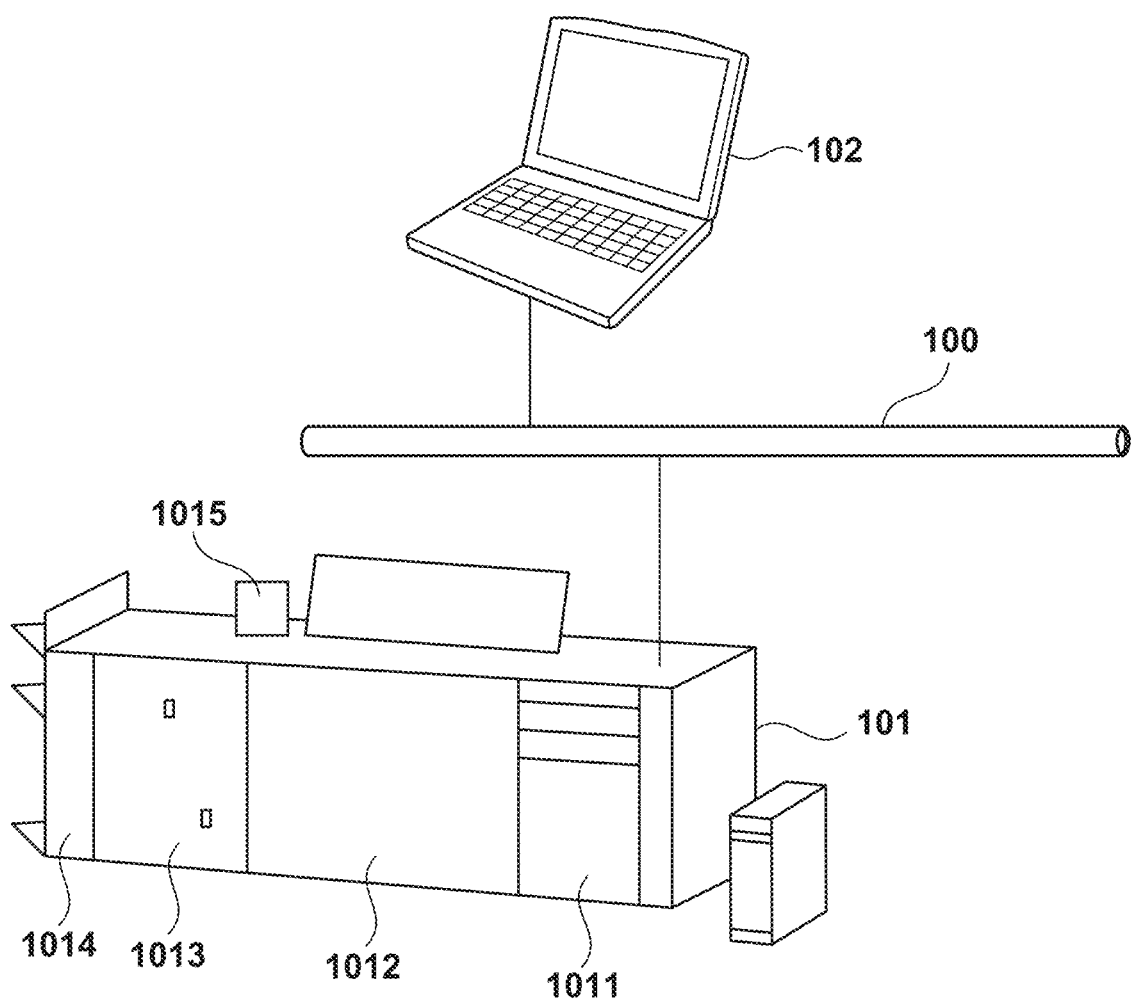
FIG. 1 is a view for describing a configuration of a print system.

FIG. 1 is a view for describing a configuration of a print system (or an image forming system) which is an embodiment of the present invention. As illustrated in FIG. 1, for a printing system, an information processing apparatus 102 and a printing apparatus (or an image forming apparatus) 101 are connected by a LAN (a local area network) 100. The printing apparatus 101 can print a print job received from the information processing apparatus 102.

The printing apparatus 101 includes a sheet feeder unit 1011, an image forming unit 1012, an inspection unit 1013, a discharge unit 1014, and an operation unit 1015. The sheet feeder unit 1011 is equipped with a plurality of stacking trays (called sheet feed trays), and sheets (called print media) such as cut paper of the same or differing types or differing sizes can be placed on each tray. For example, normal paper printed at a normal quality can be placed in one tray, and a coated paper for printing at a high quality can be placed in another tray. A tray targeted for feeding is specified by a print job, for example, and sheets removed from the specified tray are conveyed to the image forming unit 1012. The specified tray can be changed even during one print job.

A sensor (image sensor) for detecting the size of the placed sheets is provided in each tray. A target for detection may be the actual size of a sheet or may be a position of a frame for placement. Note, an attribute (this is called the sheet type) other than the size of placed sheets may be detected by the sensor or may be set from an operation unit 1015 or the like by an operator. The size may be specified by the operator. By this, the image forming apparatus 101 can specify the size or type of the placed sheets in each tray.

The image forming unit 1012 forms an image generated from print data specified by the print job on a sheet conveyed from the sheet feeder unit 1011. In the present example, the image forming unit 1012 may be, for example, an electrophotographic image forming unit that forms an image using toner as a coloring agent. The image forming unit 1012 develops an electrostatic latent image formed on a photoconductor by toner and transfers, heats, and then fixes the image to the sheet. In the case of a color image, a toner image of each color component is transferred to the sheet and a color image is formed by fixing these toner images.

In the printing apparatus 101, color conversion (basic color conversion) that converts the color component specified in the image data into the color component of the toner is performed. Since an ideal color cannot always be expressed by basic color conversion, color correction (also called gradation correction) is further performed using the correction information. The color correction is performed in accordance with the sheet type, for example. This is because the appearance of colors in accordance with the sheet type differs. Also, if a color shift occurs, correction may be performed as appropriate to eliminate the color shift. In order to correct the color shift as appropriate, the printing apparatus 101 has a color correction function. In the color correction function, there is correction information for each sheet type, for example, the color value of a gradation patch formed on the sheet is measured, and a difference between a color value (reference information) which should actually be expressed and the measured color value (measurement information) is reflected in the correction information.

A sheet on which image formation is performed by the image forming unit 1012 is conveyed to the inspection unit 1013, and then the color can be read by the color measurement sensor while the sheet is transported for the color correction. In the present example, the target of color measurement is a chart for gradation correction (also called a color chart) formed on a sheet and the position, gradation, or the like is set in advance. The color measurement sensor is arranged at a position corresponding to the chart for gradation correction and measures the color values of the chart for gradation correction. In the present example, although the inspection unit 1013 targets only one side, configuration may be such that the chart for gradation correction on both sides are measured in parallel. Note, as a method of printing the chart for color measurement, one of two methods may be selected.

The first method is a method in which the chart for gradation correction is interrupted while a job is being executed. In this method, a sheet on which only the chart for gradation correction is formed is inserted during the job, and it is the target of inspection. The processing for printing the chart for gradation correction may be a job that interrupts the original print job and this job may be called an interrupt job, for example. Since the sheet onto which an image was formed was interrupted by the interrupt job in the print job, a sheet discharging tray for discharging an insertion sheet on which the chart for gradation correction was formed that was already measured may be arranged in the inspection unit 1013. If the insertion sheet is discharged here, only the sheet according to the print job is conveyed to the discharge unit 1014 of the subsequent stage. The first method is also called an interrupt mode.

The second method is a method in which a chart for gradation correction is formed in the margins of a sheet onto which an image according to a print job is formed. In this method, it is possible to form the chart for gradation correction on every sheet and perform color measurement. In order to make it possible to select between the first method and the second method, the formation position of the chart for gradation correction in a sheet shape may be a fixed position regardless of the method. In such a case, the position of the chart for gradation correction becomes a position corresponding to the margin even in the first method. The second method is also called a margin utilization mode.

The sheet which passes through the inspection unit 1013 is conveyed to the discharge unit 1014 and is discharged to the specified sheet discharging tray. If the mechanism is such that switching of a discharge destination is performed by switching guide claws arranged at a branch point of the transport path, for example, the guide claws can be driven to switch the route once the tip of the sheet has passed through the branch point. For this reason, it is possible to switch the output tray per sheet. For example, in a case where a sheet is to be inserted in order to form a chart for gradation correction in a print job, the discharge unit 1014 can also eject the sheet inserted for the chart for gradation correction to a paper ejection tray different from the print job sheet.

The operation unit 1015 has an operation panel for the operator to perform various operations and monitoring. The printing system may be configured so that the operations and monitoring performed by the operation unit 1015 can be performed by the information processing apparatus 102. The operations may include, for example, an instruction to insert a sheet for a chart for every predetermined number of pages (or may be a predetermined sheet number).

Control System Hardware

Figure 2:
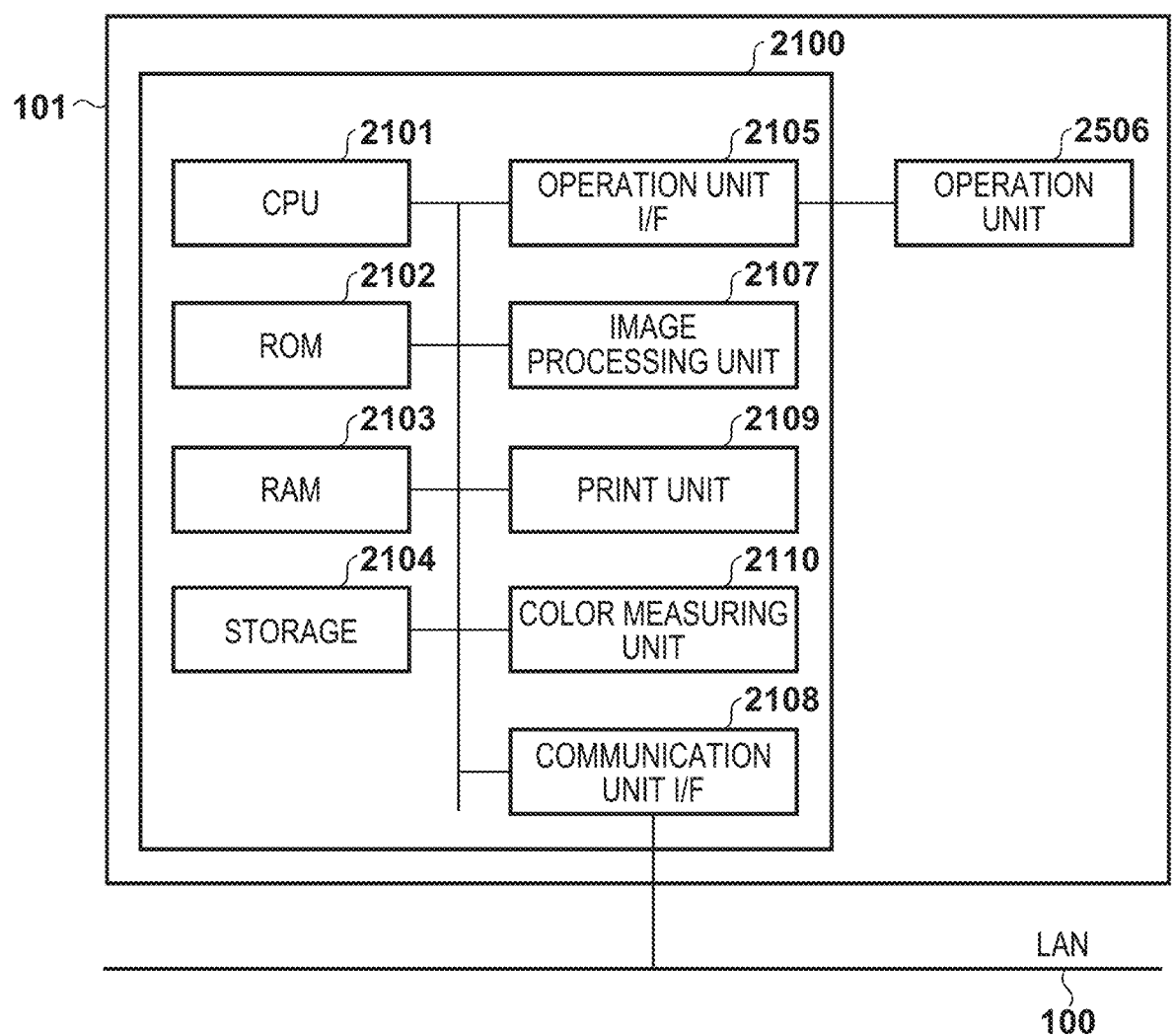
FIG. 2 is a block diagram for describing a hardware configuration of a printing apparatus.

FIG. 2 is a block diagram for describing a hardware configuration of a control system of the printing apparatus 101 according to the present embodiment. The printing apparatus 101 has a print function for printing an image on a sheet. Although a printing apparatus is described in the example in the present embodiment, the printing apparatus may be a printing apparatus such as an MFP (Multifunction Peripheral) including a scanner and a FAX function. A control unit 2100 including a CPU (Central Processing Unit) 2101 controls operations of the whole printing apparatus 101. The CPU 2101 loads a program stored in a ROM (Read Only Memory) 2102 or a storage 2104 to a RAM 2103, and executes it to perform various control such as print control or reading control. The ROM 2102 stores control programs, boot programs, or the like which can be executed by the CPU 2101. The RAM (Random Access Memory) 2103 is a main memory of the CPU 2101 and is used as a temporary storage region for loading a work area or various control programs. The storage 2104 stores print data, image data, various programs, and various setting information. The storage 2104 is non-volatile and has a management structure for each file. Although an auxiliary memory device such as an HDD (Hard Disk Drive) is envisioned as the storage 2104 in the present embodiment, a non-volatile memory such as an SSD (Solid State Drive) may be used. Note, in the printing apparatus 101 according to the embodiment, it is assumed that one CPU 2101 uses one memory (RAM 2103) to execute each process shown in the flowchart described later, but other modes may be used. For example, each process shown in the flowchart described later may be executed with a plurality of CPUs, RAM, ROM, and storage operating in tandem. Also, a hardware circuit such as an ASIC (Application Specific Integrated Circuit) or an FPGA (Field Programmable Gate Array) may be used to execute a part of the processing.

An operation unit interface (I/F) 2105 connects to an operation unit 2106 and the control unit 2100. The operation unit 2106 is provided with a display unit having a touch panel function, various hard keys, and the like, and functions as a display unit for displaying information and a reception unit for receiving user's instructions. The operation unit 2106 is the same as the operation unit 1015 illustrated in FIG. 1.

An image processing unit 2107 loads a print job received via a communication unit I/F 2108 and is provided with RIP (Raster Image Processor) function for generating image data to be used in printing. Also, the image processing unit 2107 loads the print job and can perform resolution conversion or the correction processing of the obtained image data. Note, although it is envisioned that the image processing unit 2107 is realized by a hardware circuit (such as an ASIC or an FPGA) in the present embodiment, there is no limitation to this. For example, the printing apparatus 101 may further include a processor for image processing applications, and the processor may realize the image processing or loading processing to the print data by executing the image processing program. In such a case, it is assumed that this processor and the CPU 2101 cooperate to realize the flowchart described later. Furthermore, configuration can also be made such that the CPU 2101 executes a program for performing image processing to perform image processing and print data loading processing. The image processing may also be carried out by combining any of these.

A print unit (printer engine) 2109 prints an image onto a sheet fed from a sheet feeding cassette (not shown) based on the image data generated by the image processing unit 2107. Note, although the print method of the print unit 2109 may be an electrophotographic type as described in FIG. 1, another print method such as an inkjet method or a thermal transfer method can be applied. The sheet feeder unit 1011 through to the discharge unit 1014 illustrated in FIG. 1 are included in the print unit 2109. However, the color measurement sensor of the inspection unit 1013 corresponds to a color measuring unit 2110 described later.

The color measuring unit 2110 is included in the inspection unit 1013 of FIG. 1. In other words, the color measuring unit 2110 is positioned downstream of the sheet conveyance path of the print unit 2109, and the color of the patch for gradation correction of each color of the chart for gradation correction formed on the printed sheet is measured by a CIS color sensor, and color measurement data is obtained. The sheet size and sheet type whose color can be measured by the color measuring unit 2110 are limited. The color measuring unit 2110 can also be called an inline sensor.

The control unit 2100 is connected to the LAN 100 via the communication unit I/F 2108. The communication unit I/F 2108 performs reception of a print request (print job) from the information processing apparatus on the LAN 100.

Although the above described configuration example is described as one example of a print system in the present embodiment, it is not limited to this. At least one or more information processing apparatus and printing apparatus is communicably connected via a network. Additionally, the network may be wireless or wired.

Software

Figure 3:
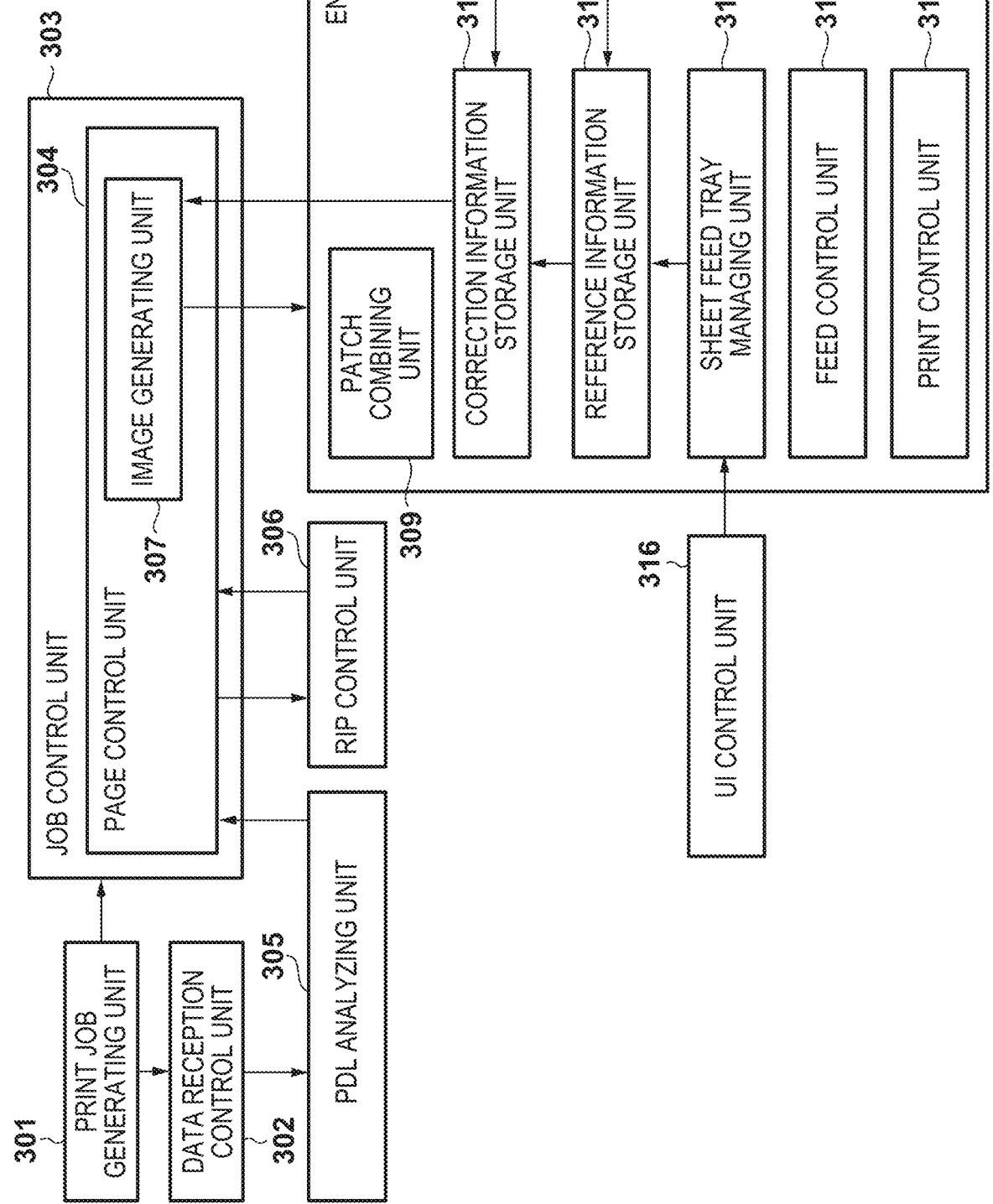
FIG. 3 is a block diagram for describing a software configuration of the printing apparatus.

FIG. 3 is a block diagram for describing a software configuration of the printing apparatus 101 according to the present embodiment.

A print job generating unit 301 generates a print job when a job is input from the information processing apparatus 102 and registers it to a job control unit 303.

The job control unit 303 instructs a page control unit 304 of the start of processing in order from the first page for all the pages included in the registered print job, and causes page processing to start. When the page control unit 304 notifies that the processing of the next page can be started, the start of the processing of the next page is repeatedly instructed. Also, when a notification of the end of processing is received from the page control unit 304 regarding every page, the end of a job is notified to the print job generating unit 301.

The page control unit 304 receives a page processing start notification from the job control unit 303 and controls the processing of each page. The processing of each page includes the generation of an image formed on each page.

A data reception control unit 302 receives PDL data transmitted from the information processing apparatus 102 via the communication unit I/F 2108.

A PDL analyzing unit 305 analyses the received PDL data and converts it into intermediate data. A RIP control unit 306 rasterizes the intermediate data and converts it into image data of a bitmap format.

An image generating unit 307 reflects the correction information of the sheet (hereinafter, also referred to as a sheet) used for printing on the generated image data in the bitmap format to generate the corrected printed image. Then, the print image is transferred to a patch combining unit 309 of an engine control unit 308. The image generating unit 307 handles control of the image processing unit 2107 of FIG. 2.

The engine control unit 308 includes the patch combining unit 309, a correction information storage unit 310, a reference information storage unit 311, a color measurement sensor control unit 312, a sheet feed tray managing unit 313, a feed control unit 314, and a print control unit 315. The color measurement sensor control unit 312 handles the control of the color measuring unit 2110. Also, the patch combining unit 309, the correction information storage unit 310, the reference information storage unit 311, the sheet feed tray managing unit 313, the feed control unit 314, and the print control unit 315 handle control of the print unit 2109. Specifically, the feed control unit 314 controls the sheet feeder unit 1011. Also, in addition to image formation by the image forming unit 1012, the print control unit 315 may control the conveyance of a sheet from the inspection unit 1013 to the discharge unit 1014.

The patch combining unit 309 combines a chart for gradation correction including predetermined gradation patches in a print image such that the chart for gradation correction is formed by adding it to an image to be formed based on the corrected print image that was received from the image generating unit 307. Also, the print control unit 315 is instructed to print the combined image. Note, in the interrupt mode, the image combined with the chart for gradation correction may be a blank image. Alternatively, it may be that only the chart for gradation correction is used and combination is not be performed. Note, a gradation patch may be converted to image data in advance by using a basic color conversion which will be used for image generation then saved. If such a gradation patch is used, the difference between the reference information indicating the color that should be originally expressed and the measurement information indicating the color measured by the sensor can be specified as the correction information. For example, by reflecting the correction information in the image data after color conversion and performing color correction, an image can be formed on the sheet with a target color. As a method of reflection, for example, a correction value may be simply added for each density. Since a sample is prepared for each representative density of the gradation patch, the density between the samples may be interpolated linearly or the like, for example.

The feed control unit 314 controls the sheet feed tray in accordance with an instruction of the print job, and conveys and supplies the collected sheets to the sheet feed tray. Note, the printing of a mark for gradation correction in the interrupt mode may be included in the print job as a part thereof. In such a case, configuration may be taken such that specification of a sheet in the interrupt mode is also specified by a print job. Alternatively, an interrupt job which interrupts the print job may be generated and printing of the mark for gradation correction may be performed according thereto. In that case, specification of a sheet may be performed by the interrupt job in the interrupt mode.

The print control unit 315 prints the printed image on which the gradation patch has been combined on the sheet supplied by the feed control unit 314, and then discharges the printed image. In the present embodiment, an image is formed on a sheet based on image data onto which information of a chart for the gradation correction (gradation patch) was added as necessary.

The color measurement sensor control unit 312 controls the color measuring unit 2110 so as to measure the mark for gradation correction formed on the sheet and obtains color measurement data.

The reference information storage unit 311 holds reference information generated based on the color measurement data obtained by the color measurement sensor control unit 312 for every sheet type set in the sheet feed tray. In the present embodiment, correction information is generated so as to correct the color (gradation) of the image so that the measurement information of the gradation patch matches the reference information.

The correction information storage unit 310 holds the correction information, which is obtained by comparing the reference information held by the reference information storage unit 311 with the color measurement data acquired by the color measurement sensor control unit 312, for each sheet type set in the sheet feed tray.

The sheet feed tray managing unit 313 manages information of the size and type of the sheet set in all sheet feed trays that printing apparatus 101 includes. Also, the reference information, which the reference information storage unit 311 holds, is cleared, in accordance with registration request of a sheet from a UI control unit 316, for the sheet types that will be removed for exchange. Furthermore, in a case where the correction information storage unit 310 is holding the correction information for a sheet type that will be removed for exchange, the correction information storage unit 310 also clears the correction information.

When the user operates the operation unit 2106 and information of a sheet in the sheet feed tray is set, the UI control unit 316 requests registration of the sheet to the sheet feed tray managing unit 313. Also, information of the sheet for which registration is completed is displayed on the operation unit 2106. The UI control unit 316 handles control of the operation unit 2106.

Basic Sequence

Next, a basic sequence of print processing is described in which a patch for gradation correction is formed on output paper of a print job, measured in real time by a color measurement sensor, and the correction value is continuously fed back to a subsequent page. Hereinafter, this control will be called real time gradation correction.

There are two types of real time gradation correction, a margin utilization type in which the margins of the output sheet are used and the patch is printed, and a chart insert type in which a dedicated sheet is inserted and the patch is printed in a case where the margins of the output sheet cannot be used. In the margin utilization type, a patch is printed on each page in the margin of the print data inputted by the user, and feedback correction is performed. This corresponds to the aforementioned margin utilization mode. In contrast to this, in the chart insert type, a patch is printed onto a dedicated sheet in intervals set in advance in the printing apparatus 101, and the feedback correction is performed. This corresponds to the aforementioned interrupt mode. Whether the real time gradation correction is executed by the margin utilization type or is executed by the chart insert type is instructed to the printing apparatus when the user inputs a print job.

Margin Utilization Type Print Processing

Figure 4A:
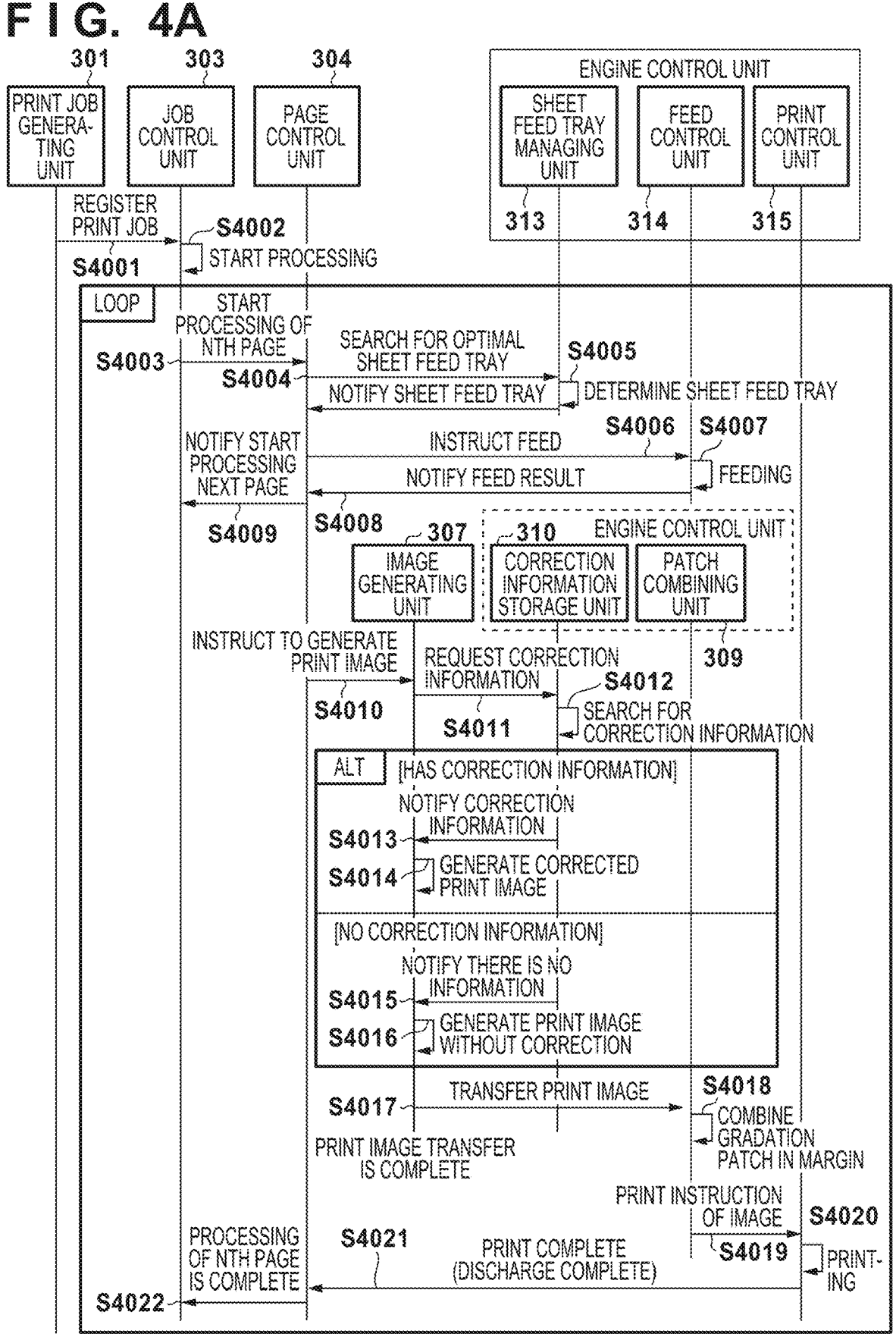
FIG. 4A is a sequence diagram of print processing of a margin insert type.
Figure 4B:
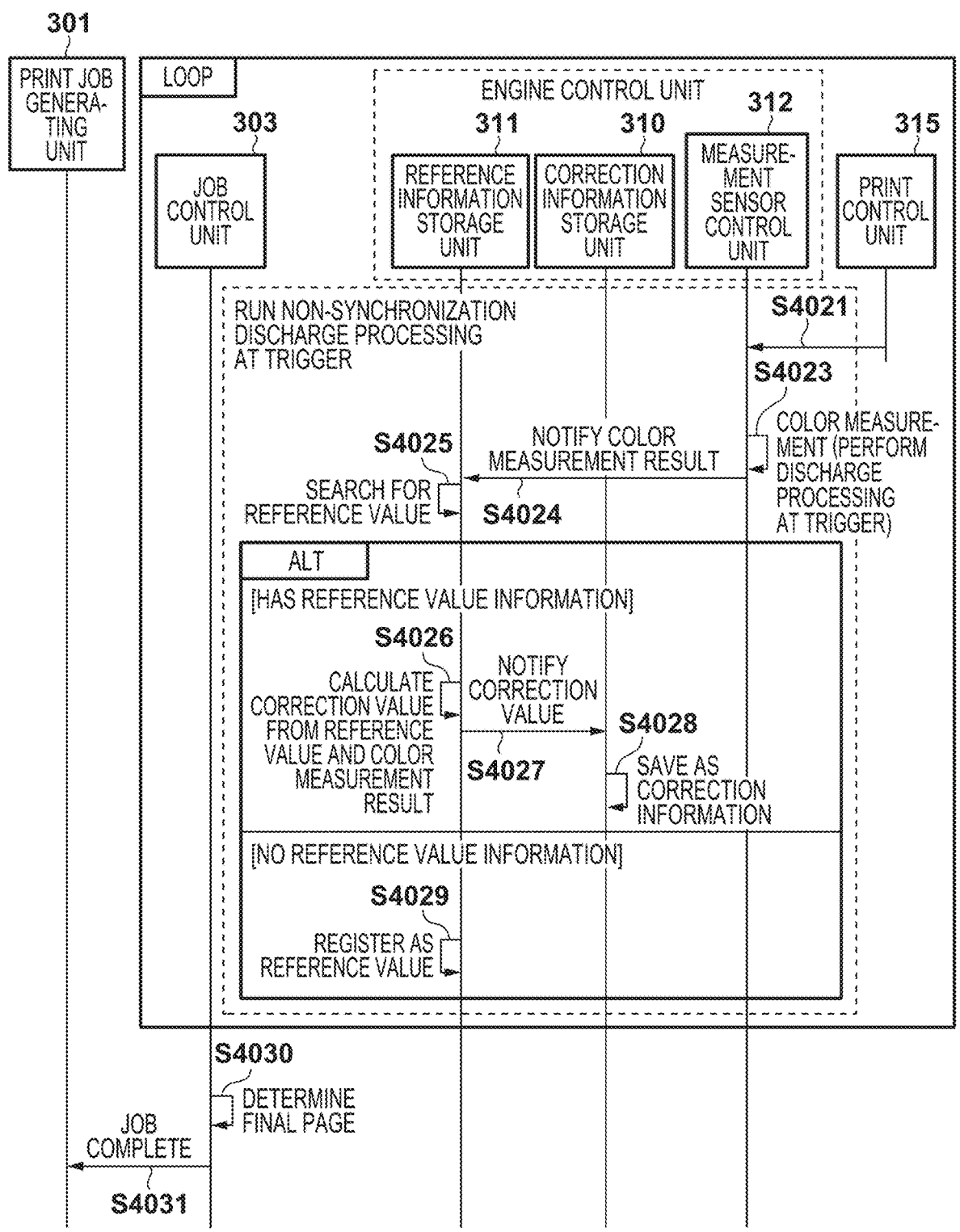
FIG. 4B is a sequence diagram of print processing of a margin insert type.

Firstly, a basic operation sequence of margin utilization type print processing is described using FIG. 4A and FIG. 4B. This sequence is realized by the CPU 2101 of the printing apparatus 101 reading a program stored in the ROM 2102 to the RAM 2103 and executing it. Note, FIG. 4A and FIG. 4B show a series of sequences divided into two, and the frames shown as loops (LOOP) in FIG. 4A and FIG. 4B are not each independent loops, but rather are shown by dividing one loop due to the size limitation of the figure.

A job generation unit 301 generates a print job received from the I/F. The job generation unit 301 registers the generated job to the job control unit 303 (step S4001). The job control unit 303 determines an execution order of the registered jobs and starts sequential processing (step S4002). In step S4002, the started processing is repeated for each page until the final page.

The job whose processing was started by the job control unit 303 notifies the start of processing for an Nth page to the page control unit 304 (step S4003). When the page control unit 304 receives the start of processing for an Nth page from the job control unit 303, the page control unit 304 queries the sheet feed tray managing unit 313 as to which sheet feed tray sheets of the sheet size and sheet type specified for the page are to be fed from (step S4004). The sheet feed tray managing unit 313 determines which sheet feed tray the specified sheet size and sheet type are to be fed from (step S4005), and returns the result to the page control unit 304.

The page control unit 304 instructs the feed control unit 314 to feed a sheet from the sheet feed tray determined by the sheet feed tray managing unit 313 (step S4006). The feed control unit 314 performs feeding of a sheet from the instructed sheet feed tray in accordance with the feeding instruction from the page control unit 304 (step S4007) and notifies the feed result to the page control unit 304 (step S4008). When the page control unit 304 receives a normal feed result from the feed control unit 314, the page control unit 304 notifies that the start of processing of the next page is possible to a job control unit 303 (step S4009). Also, when the page control unit 304 receives a normal feed result from the feed control unit 314, the page control unit 304 performs an instruction for a generation and transfer of a printed image to the image generating unit 307 (step S4010). At this time, the sheet feed tray from which the sheet was fed, the sheet size, and the sheet type are notified from the page control unit 304 to the image generating unit 307.

When the image generating unit 307 receives the instruction for a generation and transfer of a printed image, the image generating unit 307 requests for correction information to the correction information storage unit 310 based on the notified information (step S4011). The correction information storage unit 310 searches for whether the correction information corresponding to the transferred information is saved in the RAM 2103 (step S4012). In a case where the correction information storage unit 310 detected the corresponding correction information, the correction information storage unit 310 notifies the correction information to the image generating unit 307 (step S4013). The image generating unit 307 uses the correction information notified from a image information storage unit 310 to generate a printed image (step S4014). On the other hand, in a case where the correction information storage unit 310 cannot detect the correction information corresponding to the transferred information, the correction information storage unit 310 notifies that there is no correction information to the image generating unit 307 (step S4015). In a case where there is no correction information, the image generating unit 307 generates a printed image with no correction (step S4016). The image generating unit 307 transfers the generated print image and information of the sheet feed tray, the sheet size, and the sheet type notified from the page control unit 304 to the patch combining unit 309 (step S4017).

The patch combining unit 309 combines the chart for gradation adjustment (gradation patch) with the margin of print image transferred by the image generating unit 307 (step S4018). Next, the patch combining unit 309 sends the generated combined image and the information of the sheet feed tray, the sheet size, and the sheet type notified from the image generating unit to the print control unit 315 to perform a print instruction (step S4019). The print control unit 315 prints the received image (the image in which the mark information for the gradation adjustment has been combined) onto the sheet supplied by the feed control unit 314 (step S4020). When printing completes, the print control unit 315 performs a notification of a print completion (discharge completion) to the page control unit 304 and the color measurement sensor control unit 312, respectively (step S4021). The information of the sheet feed tray, the sheet size, the sheet type, and the like are added to the notification of the print completion (discharge completion).

When the page control unit 304 receives the notification of the print completion (discharge completion) from the print control unit 315, the page control unit 304 notifies the completion of the processing of the Nth page to the job control unit 303 (step S4022).

Meanwhile, when the color measurement sensor control unit 312 receives the notification of print completion (discharge completion) from the print control unit 315, the color measurement sensor control unit 312 performs color measurement of the chart for the gradation adjustment (gradation patch) printed in step S4020 (step S4023). Next, the color measurement result and the information of the sheet feed tray, the sheet size, the sheet type, and the like notified from the print control unit 315 are associated and notified to the reference information storage unit 311 (step S4024).

The reference information storage unit 311 performs a search as to whether a reference value corresponding to the information notified from the color measurement sensor control unit 312 is saved in the RAM 2103 (step S4025). In a case where the reference value corresponding to the notified information is saved, the correction value is calculated from the saved reference value and the color measurement result notified from the color measurement sensor control unit 312 (S4026). Next, the reference information storage unit 311 notifies the calculated correction value to the correction information storage unit 310 (step S4027). The correction information storage unit 310 saves the contents notified from the reference information storage unit 311 as correction information (step S4028).

In step S4025, in a case where the reference value is not saved, the reference information storage unit 311 saves the information (such as color measurement result, sheet feed tray, sheet size, and sheet type) notified from the color measurement sensor control unit 312 to the RAM 2103 as a reference value (step S4029).

Here, the processing of step S4003 to step S4025 is expressed as LOOP in the sense that it is executed for every pages of the print job registered in the job control unit 303. It is possible for the start of processing for each page shown in step S4003 to be issued when a notification that start of processing of the next page is possible is received in step S4009.

When the job control unit 303 receives completion of processing of the Nth page, the job control unit 303 determines whether or not the Nth page is the final page of the print job (step S4030). When the job control unit 303 determines that a completion from the final page was received, the job control unit 303 notifies the end of the job to the print job generating unit 301 (step S4031).

Chart Insert Type Print Processing

Figure 14:
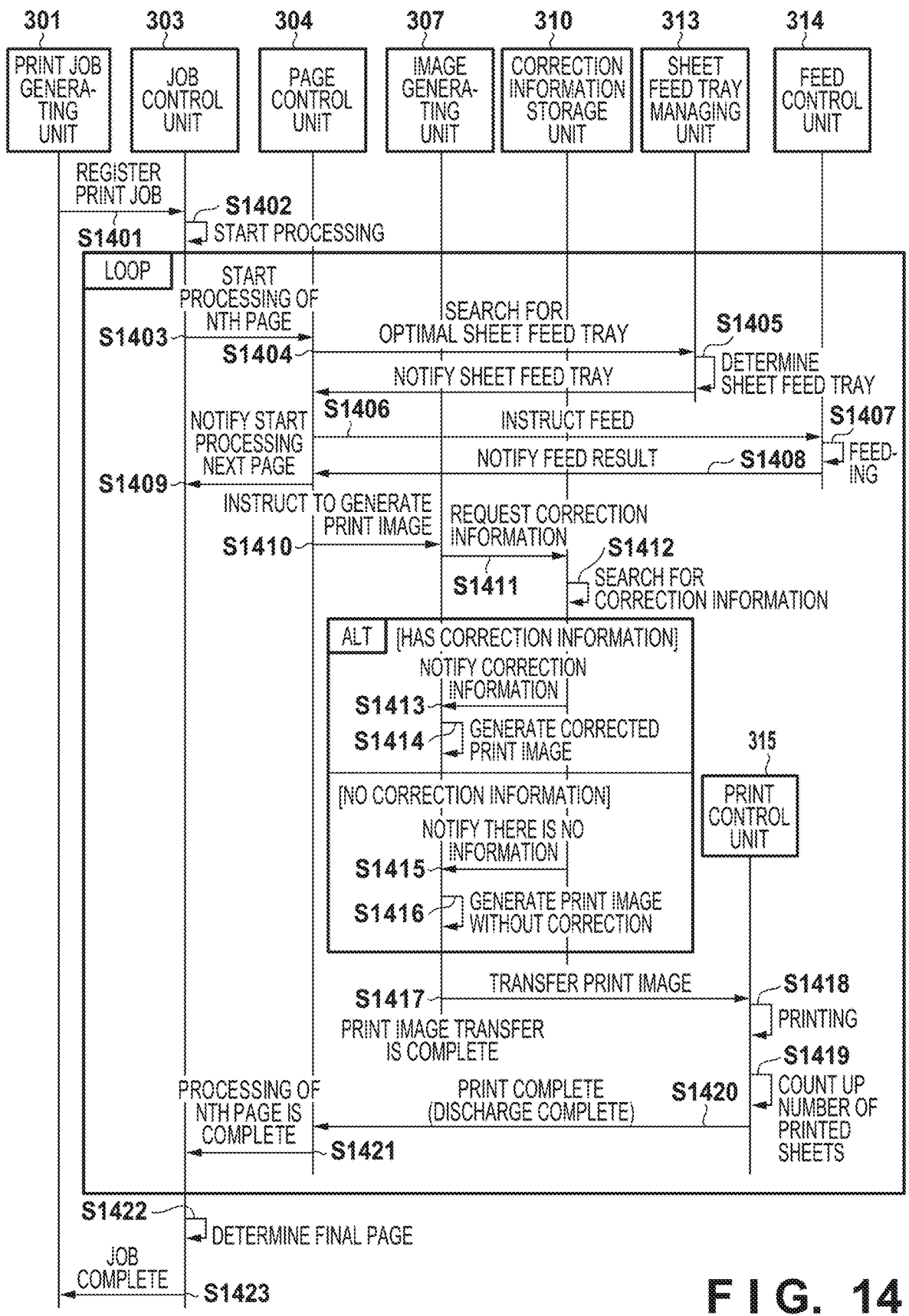
FIG. 14 is a sequence diagram of print processing of a chart insert type (printing of print data).
Figure 15:
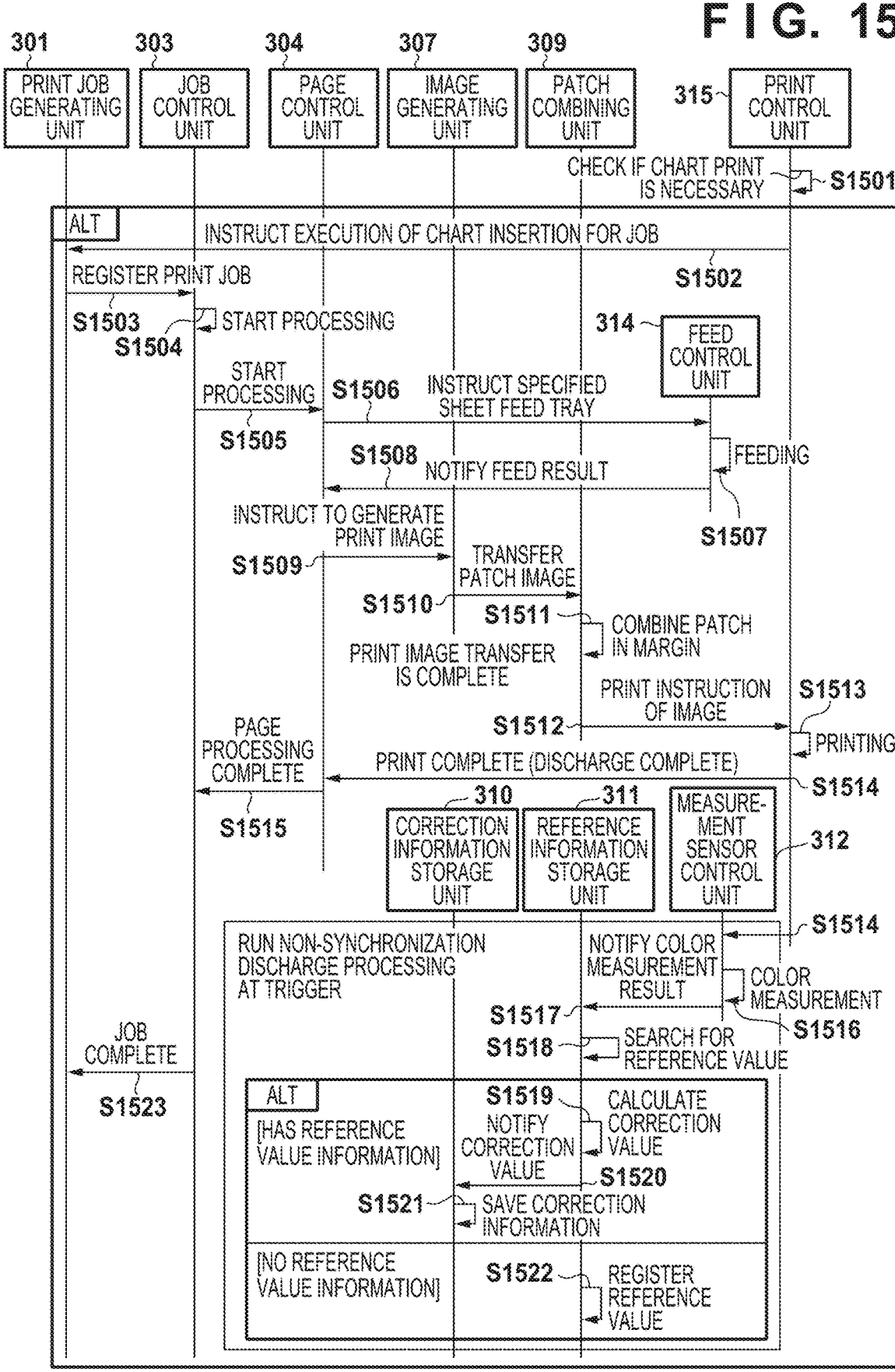
FIG. 15 is a sequence diagram of print processing of a chart insert type (printing of a chart).

Next, a basic operation sequence of chart insertion type print processing is described using FIG. 14 and FIG. 15. FIG. 14 is a sequence in which print data will be printed as an image, and FIG. 15 is a sequence in which a correction chart to be inserted will be printed. This sequence is realized by the CPU 2101 of the printing apparatus 101 reading a program stored in the ROM 2102 to the RAM 2103 and executing thereof Print Data Print Processing Firstly, a sequence in which print data will be printed is described using FIG. 14. The job generation unit 301 generates a print job received from the I/F. The job generation unit 301 registers the generated job to the job control unit 303 (step S1401). The job control unit 303 determines an execution order of the registered jobs and starts sequential processing (step S1402). The steps following step S1403 are repeated for each page until the final page.

When execution of the job is processed, the job control unit 303 notifies the start of processing for an Nth page to the page control unit 304 (step S1403). When the page control unit 304 receives the start of processing for an Nth page from the job control unit 303, the page control unit 304 queries the sheet feed tray managing unit 313 which sheet feed tray the sheet size and sheet type specified for the page are to be fed from (step S1404). The sheet feed tray managing unit 313 determines which sheet feed tray the specified sheet size and sheet type are to be fed from (step S1405), and returns the result to the page control unit 304. The page control unit 304 instructs the feed control unit 314 to feed a sheet from the sheet feed tray determined by the sheet feed tray managing unit 313 (step S1406). The feed control unit 314 performs feeding of a sheet from the instructed sheet feed tray in accordance with the feeding instruction from the page control unit 304 (step S1407) and notifies the feed result to the page control unit 304 (step S1408). When the page control unit 304 receives a normal feed result from the feed control unit 314, the page control unit 304 notifies that the start of processing of the next page is possible to the job control unit 303 (step S1409).

Also, when the page control unit 304 receives a normal feed result from the feed control unit 314, the page control unit 304 performs and instruction for a generation and transfer of a printed image to the image generating unit 307 (step S1410). At this time, the sheet feed tray from which the sheet was fed, the sheet size, and the sheet type are notified from the page control unit 304 to the image generating unit 307. When the image generating unit 307 receives the instruction for a generation and transfer of a printed image, the image generating unit 307 requests correction information for the corresponding print medium, particularly the sheet type, to the correction information storage unit 310 based on the notified information (step S1411). The correction information storage unit 310 searches for whether the correction information corresponding to the transferred information is saved in the RAM 2103 (step S1412).

In a case where the correction information storage unit 310 detected the corresponding correction information, the correction information storage unit 310 notifies the correction information to the image generating unit 307 (step S1413). The image generating unit 307 uses the correction information notified from the image information storage unit 310 to generate a printed image (step S1414). On the other hand, in a case where the correction information storage unit 310 cannot detect the correction information corresponding to the transferred information, the correction information storage unit 310 notifies that there is no correction information to the image generating unit 307 (step S1415). In a case where there is no correction information, the image generating unit 307 generates a printed image with no correction (step S1416).

The image generating unit 307 transmits the generated print image and information of the sheet feed tray, the sheet size, and the sheet type notified from the page control unit 304 to the print control unit 315 to perform a print instruction (step S1417). The print control unit 315 prints the received image onto the sheet supplied by the feed control unit 314 (step S1418). Here, the mark information for gradation adjustment is not combined in the printed image. When the printing completes, the print control unit 314 counts up the counter and stores it in the RAM 2103 (step S1419). Furthermore, the print control unit 315 performs notification of the print completion (discharge complete) to the page control unit 304 (step S1420). The information of the sheet feed tray, the sheet size, the sheet type, and the like are added to the notification of the print completion (discharge completion). When the page control unit 304 receives the notification of the print completion (discharge completion) from the print control unit 315, the page control unit 304 notifies the completion of the processing of the Nth page to the job control unit 303 (step S1421). When the job control unit 303 receives completion of processing of the Nth page, the job control unit 303 determines whether or not the Nth page is the final page of the print job (step S1422). When the job control unit 303 determines that a completion from the final page was received, the job control unit 303 notifies the end of the job to the print job generating unit 301 (step S1423).

Print Processing of Chart for Gradation Correction

Next, a sequence in which a chart to be inserted will be printed is described using FIG. 15. The print control unit 315 checks the necessity of a print of a chart whenever the print processing completes (step S1501). More specifically, it is determined whether or not the counter value counted up in step S1419 has reached the chart insertion interval set in the printing apparatus 101 in advance in the apparatus. Here, for example, the step S1501 may be executed following step S1419 of FIG. 14. Description regarding the processing procedure of step S1501 is given with reference to FIG. 16 hereinafter.

In a case where the print control unit 315 determines that the chart insertion interval was reached, the following processing of step S1502 is performed. The print control unit 315 instructs to the print job generating unit 301 execution of a job for chart insertion (step S1502). Information such as the current sheet feed tray, sheet size, and sheet type, and information that the job is for inserting a chart may be added to this instruction. The details of the process of selecting an adjustment sheet by the user will be described later with reference to FIG. 12.

When the job generation unit 301 receives an execution instruction of a job for chart insertion, the job generation unit 301 determines whether or not the sheet printed and discharged is the final page of the print job. If it is the last page, there is no point in correcting the color in that job, so the processing ends as is without doing anything. Meanwhile, if it is not the last page, the print job is generated based on an instruction from the print control unit 315. At this time, the type of sheet used in the job is the type of sheet specified as an adjustment sheet in the procedure of FIG. 12 described later. For example, if the job generation unit 301 receives the sheet feed source information for each sheet type from the sheet feed tray control unit 314 in advance, the job generation unit 301 can specify the sheet feed tray on which the adjustment sheet is placed and can generate a job for inserting a chart. The job generation unit 301 registers the generated job to the job control unit 303 (step S1503). The job control unit 303 determines an execution order of the registered jobs and starts sequential processing (step S1504). The job whose processing was started by the job control unit 303 notifies the start of processing to the page control unit 304 (step S1505). In this notification, information such as the sheet feed tray to be used, sheet size, and sheet type, and information that the interrupt job is for inserting a chart may be added. When the page control unit 304 receives the start of processing from the job control unit 303, the page control unit 304 instructs to the feed control unit 314 for a sheet to be fed from the sheet feed tray notified from the page control unit 304 (step S1506). The feed control unit 314 performs feeding a sheet from the instructed sheet feed tray in accordance with the feeding instruction from the page control unit 304 (step S1507) and notifies the feed result to the page control unit 304 (step S1508).

Also, when the page control unit 304 receives a normal feed result from the feed control unit 314, the page control unit 304 performs and instruction for a generation and transfer of a printed image to the image generating unit 307 (step S1509). At this time, information such as the sheet feed tray that fed, the sheet size, the sheet type, and a print job for chart insertion is notified from the page control unit 304 to the image generating unit 307. When the image generating unit 307 receives an instruction for generation and transfer of a printed image, the image generating unit 307 transfers the printed image for chart insertion and information of the sheet feed tray, the sheet size, and the sheet type notified from the page control unit 304 to the patch combining unit 309 (step S1510). For the chart to be inserted, in order to print only the patch image for adjustment, the print image generated by the image generating unit 307 is a blank image.

The patch combining unit 309 combines the chart for gradation adjustment (gradation patch) with the margin of print image transferred by the image generating unit 307 (step S1511). Note, the patch combining unit 309 obtains correction information (correction value) for the sheet type on which the gradation patch will be printed from the correction information storage unit 310, and may perform combination of the images after performing color correction of the gradation patch. Next, the patch combining unit 309 sends the generated combined image and the information of the sheet feed tray, the sheet size, and the sheet type notified from the image generating unit to the print control unit 315 to perform print instruction (step S1512). The print control unit 315 prints the received image (the image in which the mark information for the gradation adjustment has been combined) onto the sheet supplied by the feed control unit 314 (step S1513). When printing completes, the print control unit 315 performs a notification of a print completion (discharge completion) to the page control unit 304 and the color measurement sensor control unit 312, respectively (step S1514). The information of the sheet feed tray, the sheet size, the sheet type, and the like are added to the notification of the print completion (discharge completion). When the page control unit 304 receives the notification of the print completion (discharge completion) from the print control unit 315, the page control unit 304 notifies the completion of the processing to the job control unit 303 (step S1515).

Meanwhile, when the color measurement sensor control unit 312 receives the notification of print completion (discharge completion) from the print control unit 315, the color measurement sensor control unit 312 performs color measurement of the chart for the gradation adjustment (gradation patch) printed in step S1513 (step S1516). Next, the color measurement result and the information of the sheet feed tray, the sheet size, the sheet type, and the like notified from the print control unit 315 are associated and notified to the reference information storage unit 311 (step S1517). The reference information storage unit 311 performs a search for whether a reference value corresponding to the information notified from the color measurement sensor control unit 312 is saved in the RAM 2103 (step S1518).

In a case where the reference value corresponding to the notified information is saved, the reference information storage unit 311 calculates the correction value from the saved reference value and the color measurement result notified from the color measurement sensor control unit 312 (S1519). Next, the reference information storage unit 311 notifies the calculated correction value to the correction information storage unit 310 (step S1520). The correction information storage unit 310 saves the contents notified from the reference information storage unit 311 as the correction information (step S1521). In step S1518, in a case where the reference value is not saved, the reference information storage unit 311 saves the information (such as color measurement result, sheet feed tray, sheet size, and sheet type) notified from the color measurement sensor control unit 312 to the RAM 2103 as a reference value (step S1522). When the job control unit 303 the completion of the processing is received, the job control unit 303 notifies the end of the job to the print job generating unit 301 (step S1523).

Chart Print Necessity Check Processing (Step S1501)

Figure 16:
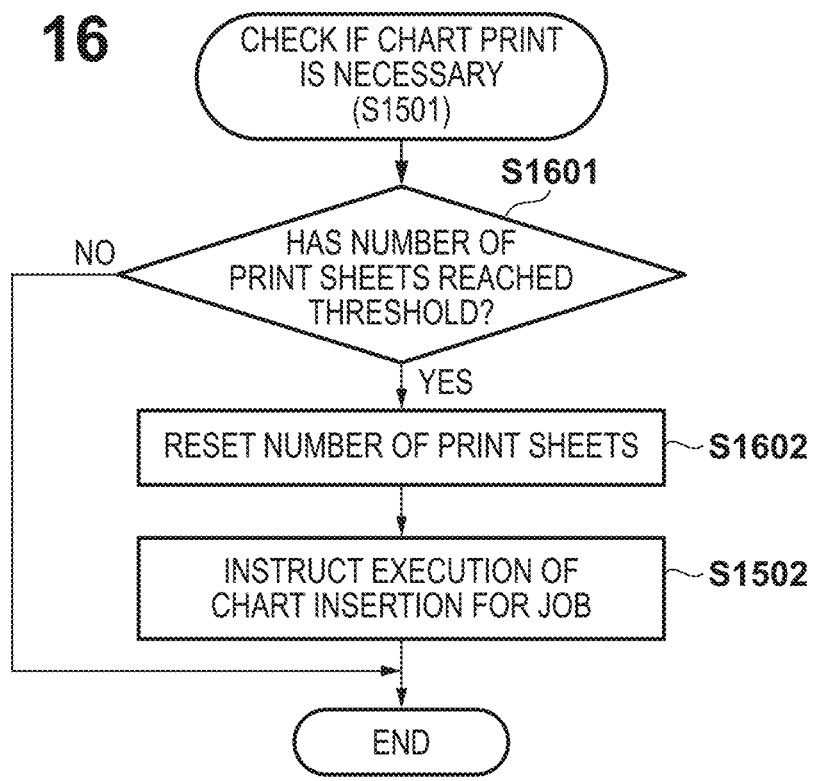
FIG. 16 is a flowchart of a chart print necessity check of a first embodiment.

Here, the contents regarding the chart print necessity check processing of step S1501 is described. FIG. 16 is a flowchart of the chart print necessity check processing in the present embodiment. Firstly, it is determined whether the counted number of print sheets has reached the threshold in step S1419 (step S1601). Note, the number of sides may be counted, and for example, one double-sided sheet may be counted as two. Considering that the larger the print volume, the more likely temporal changes will occur, it makes sense to count the number of surfaces. When the number of prints reaches the threshold value, the counted number of prints is reset to 0 (S1602). Also, an execution instruction of a job for chart insertion is transmitted to the print job generating unit 301 (step S1502).

By this procedure, it is possible to form a color patch for which the color correction is performed by using the correction value corresponding to the type on the sheet of the type specified in advance in the setting for printing the chart for color correction for every predetermined number of sheets.

Note, that rather than the procedure of FIG. 15 being executed by the print control unit 315, it may be performed by the job control unit 303, for example. In such a case, it is desirable that a count of the number of print sheets also be performed by the job control unit 303.

Clearing of Reference Information/Correction Information and Update Processing

Figure 5:
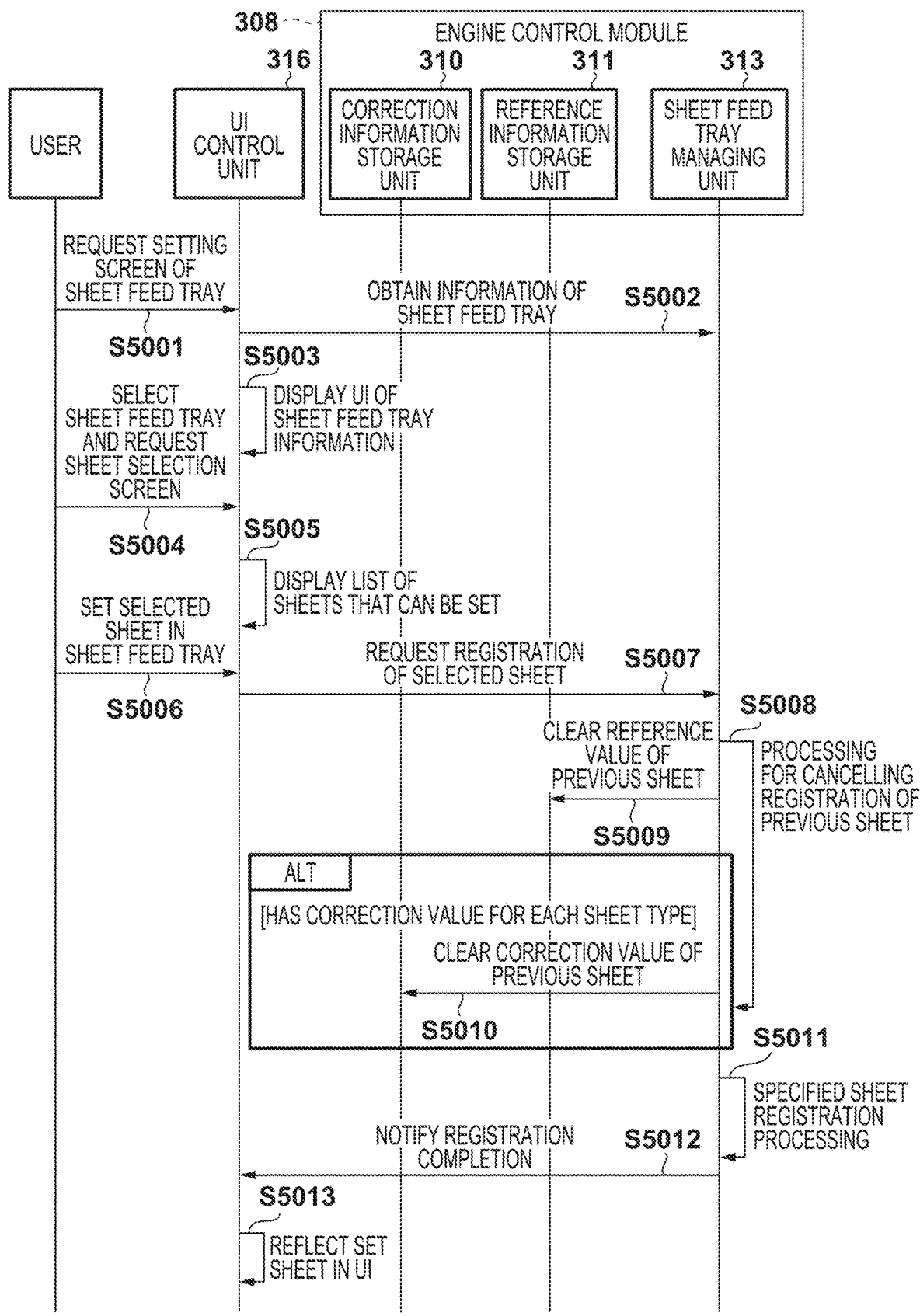
FIG. 5 is a sequence diagram of registration/deletion processing of a reference value/correction value.

Continuing on, a sequence for clearing reference information and correction information is described using FIG. 5. This sequence is realized by the CPU 2101 of the printing apparatus 101 reading a program stored in the ROM 2102 to the RAM 2103 and executing thereof.

When the printing apparatus 101 forms an image on a sheet, the characteristics differ depending on the sheet type, so it is necessary to hold reference information for every sheet type in order for the printing apparatus 101 to perform correct the gradation correction. Although the printing apparatus 101 supports a multitude of sheet types, the reference information storage unit 311 holds only the reference information of the sheet type set in the sheet feed tray since it is necessary to set the sheets that will actually be used in the sheet feed tray. For this reason, when new sheets are set in the sheet feed tray of the printing apparatus 101 by the user, the reference information and the correction information for the sheet type removed for exchange is cleared.

In step S5001, the user operates the UI screen of the printing apparatus 101 and selects the setting screen of the sheet feed tray. In step S5002, when the UI control unit 316 of the printing apparatus 101 receives an operation from the user, it obtains from the sheet feed tray managing unit 313 information of the size and type of the sheet set in every sheet feed tray that the printing apparatus 101 has. In step S5003, the UI control unit 316 displays the information obtained in step S5002 to the UI screen. An example of the screen is shown in FIG. 7A. In step S5004, the user selects from the UI screen of the printing apparatus 101 the sheet feed tray in which it is desired to change the sheet. In step S5005, when the UI control unit 316 of the printing apparatus 101 receives an operation from the user, it displays a list of the sheet types which can be set in the selected sheet feed tray to the UI screen. An example of the screen is shown in FIG. 7B.

In step S5006, the user selects the sheet type which is desired to be changed from the UI screen of the printing apparatus 101. In step S5007, when the UI control unit 316 of the printing apparatus 101 receives an operation from the user, it requests, to the sheet feed tray managing unit 313, registration of the sheet feed tray and the sheet type selected by the user. In step S5008, the sheet feed tray managing unit 313 updates the information saved in the reference information storage unit 311 and the correction information storage unit 310. A detailed flow is described later using FIG. 6A. In a case where the sheet feed tray managing unit 313 determined that a clearing of the reference information and the correction information is necessary based on the flowchart of FIG. 6A, the clearing processing in step S5009 and step S5010 are performed. In step S5009, the sheet feed tray managing unit 313 clears the reference information for the sheet type removed for exchange saved in the reference information storage unit 311. Furthermore, in step S5010, the sheet feed tray managing unit 313 determines whether the correction information for the sheet type removed for exchange is present in the correction information storage unit 310, and if it is present, the sheet feed tray managing unit 313 clears the correction information.

The sheet feed tray managing unit 313 performs registration processing of the sheet type specified to the user in step S5011 after the series processing of step S5008 is completed. In step S5012, registration completion is notified to the UI control unit 316, and in step S5013, the UI control unit 316 updates the UI screen with the information of the sheet type whose registration completed.

Figure 6B:
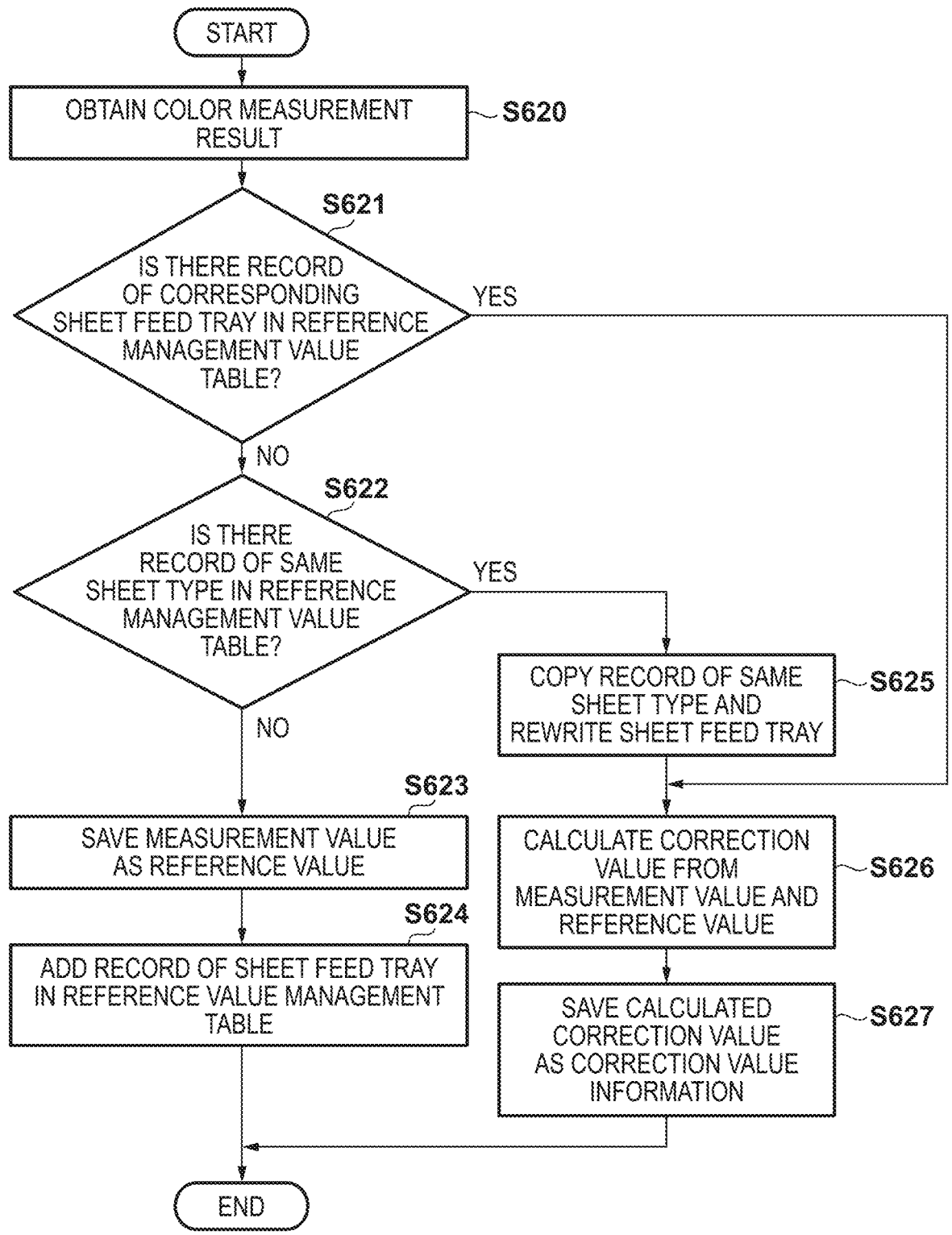

FIG. 6A and FIG. 6B show the processing flow of the sheet feed management unit 313 in association with a change of the sheet type registered in each sheet feed tray of the printing apparatus 101. FIG. 6A is a flowchart for describing a clearing of the reference information and the correction information of every sheet type, and FIG. 6B is a flowchart for describing registration of the reference information and the correction information of every sheet type.

Firstly, FIG. 6A is described. FIG. 6A is a processing flow of the sheet feed managing unit 313 when registration is requested for the sheet feed tray and the sheet type selected by the user in step S5007 of the aforementioned FIG. 5.

In step S601, the sheet feed tray managing unit 313 receives a registration request of the sheet feed tray and the sheet type selected by the user from the UI control unit 316. In step S602, the sheet feed tray managing unit 313 determines whether or not there was a change of the sheet type. Here, if there is no change (in the case of re-registration of the same type), the processing ends, and if there is a change, the process advances to step S603. In step S603, the sheet feed tray managing unit 313 confirms whether the same sheets as the sheets set in the sheet feed tray to be changed in step S601 are set in another sheet feed tray. In a case where the sheets are the same as the sheets in another sheet feed tray, the processing advances to step S605, and if this is not the case the processing advances to step S604. In step S604, since the sheet feed tray managing unit 313 does not use the sheet type before the change in every sheet feed tray, the reference value/correction value information (TBL881/ TBL883 described later) of the sheets are deleted from the reference information storage unit 311 and the correction information storage unit 310, and the processing advances to step S605. In step S605, the sheet feed tray managing unit 313 deletes a record of the information of the sheet type of the sheet feed tray whose settings are changed from the reference value management table and the correction value management table.

Next, FIG. 6B is described. FIG. 6B is a processing flow of the reference information storage unit 311 and the correction information storage unit 310 when the notification of the color measurement result from the color measurement sensor control unit 312 is received in step S4024 of the aforementioned FIG. 4B. Also, FIG. 6B is a processing flow of the reference information storage unit 311 and the correction information storage unit 310 when the notification of the color measurement result from the color measurement sensor control unit 312 is received in step S1517 of FIG. 15.

In step S620, the reference information storage unit 311 obtains the color measurement result from the color measurement sensor control unit 312. In step S621, the reference information storage unit 311 determines whether a record of the sheet feed tray associated with the color measurement result notified from the color measurement sensor control unit 312 is registered in the reference value management table. In a case where it is not registered, step S622 is advanced to, and in a case where it is registered, step S626 is advanced to. In step S622, the reference information storage unit 311 determines whether the sheet type, in another sheet feed tray, associated with the color measurement result notified from the color measurement sensor control unit 312 is registered in the reference information management table. In a case where it is not registered, step S623 is advanced to. In step S623, the reference information storage unit 311 saves the color measurement result notified from the color measurement sensor control unit 312 as a reference value (TBL 881 described later). Next, in step S624, the reference information storage unit 311 adds a record of the sheet feed tray associated with the color measurement result notified from the color measurement sensor control unit 312 to the reference value management table, and ends link processing in which the reference value saved in step S623 is referenced.

Meanwhile, in step S622, in a case where the reference information storage unit 311 confirms in the reference information management table that the sheet type associated with the color measurement result notified from the color measurement sensor control unit 312 is registered in another sheet feed tray, the processing advances to step S625. In step S625, the reference information storage unit 311 copies, to the reference information management table, the record of the same sheet type already registered in the reference information management table as a record of the sheet feed tray associated with the color measurement result notified from the color measurement sensor control unit 312. By this, the reference value of this sheet type becomes saved. Then, the processing advances to step S626.

In step S626, the reference information storage unit 311 calculates the correction value from the measurement value and the reference value, and notifies the calculated correction value to the correction information storage unit 310. Then, in step S627, the correction information storage unit 310 saves the contents notified from the reference information storage unit 311 as correction information and ends the processing.

Sheet Type Registration

A screen for registering the sheet type in the sheet feed tray of the printing apparatus 101 is described in FIG. 7A and FIG. 7B in accordance with the procedure of FIG. 5 already described.

A sheet feed tray setting screen displayed by the UI control unit 316 is shown in FIG. 7A. When the user calls the sheet feed tray setting screen (S5001), the UI control unit 316 inquires of the sheet feed tray managing unit 313 for the current sheet feed tray setting information (S5002), and the result is displayed on a screen 700. (S5003)

The user selects the sheet feed tray in which the sheet type is set in the screen 700. In the present embodiment, selection buttons 701 to 704 are assigned to the four sheet feed trays. After the user selects a specific sheet feed tray, the user presses a setting button 705 for setting the sheet type (step S5004), and a sheet type setting screen 710 of FIG. 7B is called (step S5005).

On the sheet type selection screen 710, one sheet type set in the sheet feed tray selected on the screen 700 or matching the sheet type to be set is selected. Here, the plain paper 1 is replaced with the plain paper 3 (S5006), and the OK button 708 is pressed to return to the screen 700. After the user confirms that the sheet type can be changed, the user presses an OK button 706. The UI control unit 316 notifies the setting of the user to the sheet feed tray managing unit 313 (step S5007) and performs a registration request (step S5008).

Gradation Patch and Correction Table

Next in the present embodiment, a management table (or a correction table) for holding the chart for gradation correction (gradation patch) and correction values are described with reference to FIG. 8A to FIG. 8E.

Figure 8A:
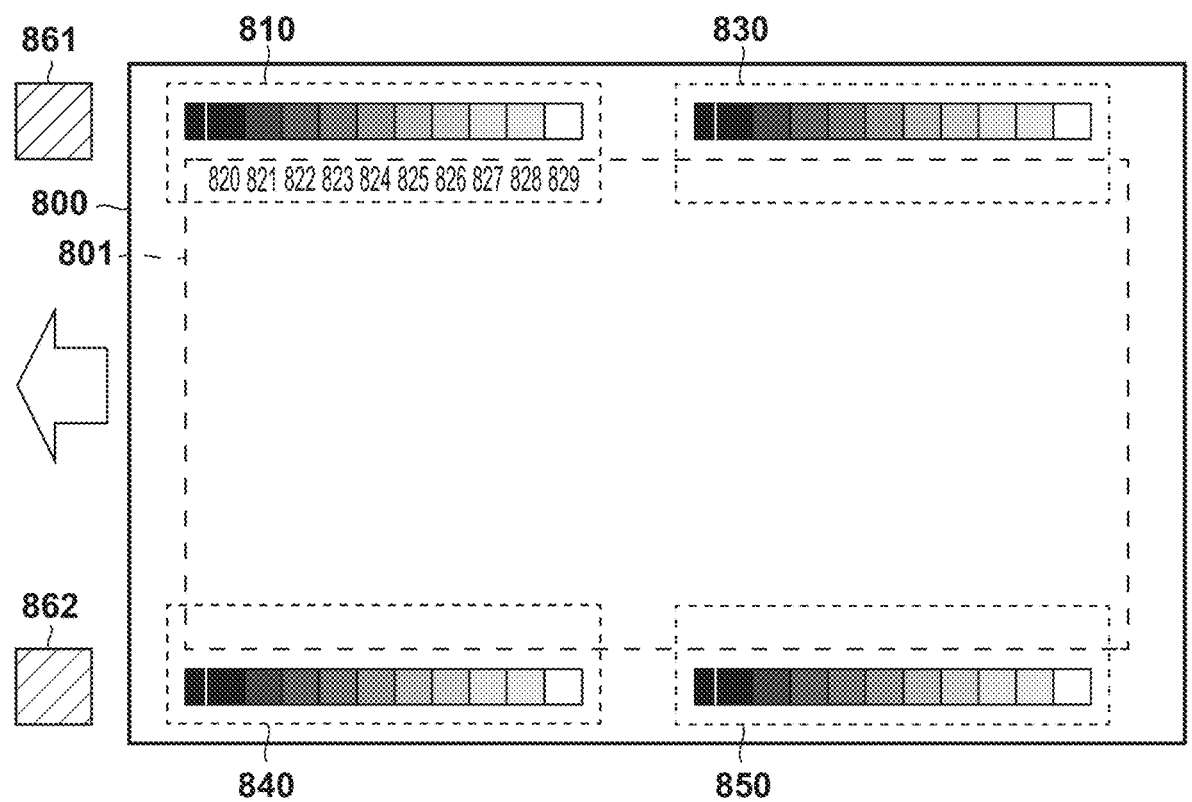
FIG. 8A is a view for illustrating one example of a patch position for real time gradation correction and of a read position of a sensor.

In FIG. 8A, an output example of the chart for gradation correction (gradation patch) 800 for the purpose of gradation correction is illustrated. The patch necessary for performing multi-gradation correction in real time is printed in a margin region defined inside a printing sheet 800 and outside a print guaranteed region 801 of the sheet. The print guaranteed region is a part which is the final product and is a region in which the printing of a user image is guaranteed. On the other hand, although the outside of the print guaranteed region is also an area in which image formation is possible, it is assumed that the final product will be trimmed and removed. Note, in the present embodiment, the patch may not always be printed in the margin. However, in order to enable switching between the interrupt mode and the margin utilization mode with one printing apparatus, the patch is printed in the margin even in the interrupt mode. Accordingly, in a case where only the interrupt mode is supported, a sensor may be arranged at the inside of the print guaranteed region 801 and a patch may be printed at the corresponding position.

The patch for the gradation correction of the present embodiment is aligned and printed in the outside of the print guaranteed region and sensors 861 and 862 of the print side read the patch. Accordingly, patches of each color are arranged in parallel with the conveyance direction according to the position of the sensors. Note, the sensors may be configured by a plurality of pairs matched with a plurality of sheet sizes.

In the printing sheet 800, a total of 40 patches are printed, with the density of each toner color of cyan 810, magenta 850, yellow 830, and black 840 being printed 10 times in 10% increments. For example, for the cyan color patch group 810, patches 820 to 829 are printed so that the density decreases in 10% increments after the patch 820 having a density of 100%. The patch 829 has a density of 10%. The same 10 patches of magenta, yellow, and black colors also form a set, and feedback information required for gradation correction can be generated only after the data of the reference value and the measured value for the four colors are all present. The gradation correction patch is combined with the generated image of the image generating unit 307 by the patch combining unit 309.

Figure 8B:
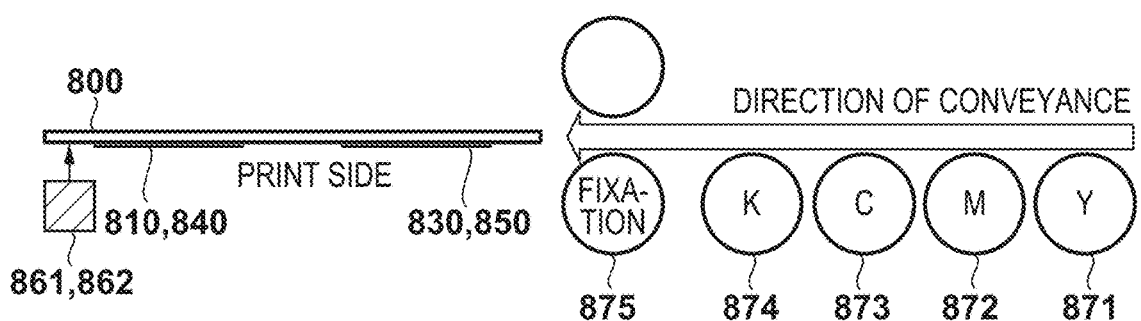
FIG. 8B is a view for illustrating one example of the direction of conveyance of a print document and a position of a print surface and sensor.

FIG. 8B is a cross-sectional view in which the conveyance path within the image forming apparatus is viewed from the side. Toner is transferred to the printing sheet 800 by the developing devices 871 to 874 of each color of CMYK, and after fixing processing by the fixing device 875, the patches 810, 830, 840, and 850 are read by the color sensors 861 and 862 provided on the left and right ends of the transport direction. The color sensors are provided on the print side.

FIG. 8C is an example of reference values, measurement values, and correction values generated based on the density information of CMYK scanned by the color sensors 861 and 862. As illustrated in FIG. 8A, since 10 patches are printed on the printing sheet 800 for each CMKY, for a total of 40 patches, measured values of the 40 patches are obtained by reading these with a sensor. In the present embodiment, the sensor control unit 312 quantifies and saves the patch densities of the color sensors in 1024 levels. The color measurement result notified from the sensor control unit 312 is held in the reference information storage unit 311 as a reference value for each sheet type set in the sheet feed tray. The color measurement result is necessary for managing each sheet type.

In a case where a color measurement result of a certain sheet notified from the sensor control unit 312 is the color measurement result of a sheet not registered in the reference information storage unit 311, the color measurement result of 40 points is saved as a new reference value (reference information) 881. This value and a reference value corresponding to this value for each color component of each toner is included in the reference value 881. If the color measurement result of the sheet notified from the sensor control unit 312 is the sheet registered in the reference information storage unit 311, the color measurement result is treated as a new measured value 882, and the correction value 883 is calculated from the difference between the reference value and the measured value. The correction value 883 is saved in the correction information storage unit 310. Note, although the correction value is saved in the present embodiment, the measurement value may be saved and the correction value may be calculated each time from the difference between the reference value and the measurement value. The color value of YMCK after reference color conversion is further corrected in accordance with the correction information. In the image generating unit 307, if the correction value is +1, for example, the color value is corrected such that the measurement value is increased only by +1. Alternatively, a color correction table used for correction is prepared. How to adjust and how to reflect it in the measurement value may be determined in advance and corrected accordingly, or the correction table may be adjusted.

FIG. 8D is one example of a table in which the reference information storage unit 311 manages reference values. The record information is configured from each item of a sheet type 891, target sheet feed tray 892, reference value (½ speed) 893, reference value (1/1 speed) 894, generated Page ID 895, and Timestamp 896. In the management table of FIG. 8D, plain paper 3 is set to the sheet feed tray 1. At 10:04:06 on 2019/07/18, in the print processing of the 60014th page cumulatively from the power input, "plain paper 3" is fed from "sheet feed tray 1" at "1/1 speed". The color of the print result is measured and is registered as a reference value. In a case where "plain paper 3" is removed from "sheet feed tray 1", the record information is deleted. This is as described in FIG. 5 and the like.

FIG. 8E is one example of a table in which the correction information storage unit 310 manages the correction values. The basic configuration of the table is the same as the reference value management table except that the reference value is replaced with the correction value. In a case where the corresponding sheet is removed from the target sheet feed tray 897, the record information is deleted.

Configuration of the Information Processing Terminal

Next, a control of an application running on the information processing terminal 102, which inputs a print job to the printing apparatus 101 that performs gradation correction as described above, is described.

Figure 10:
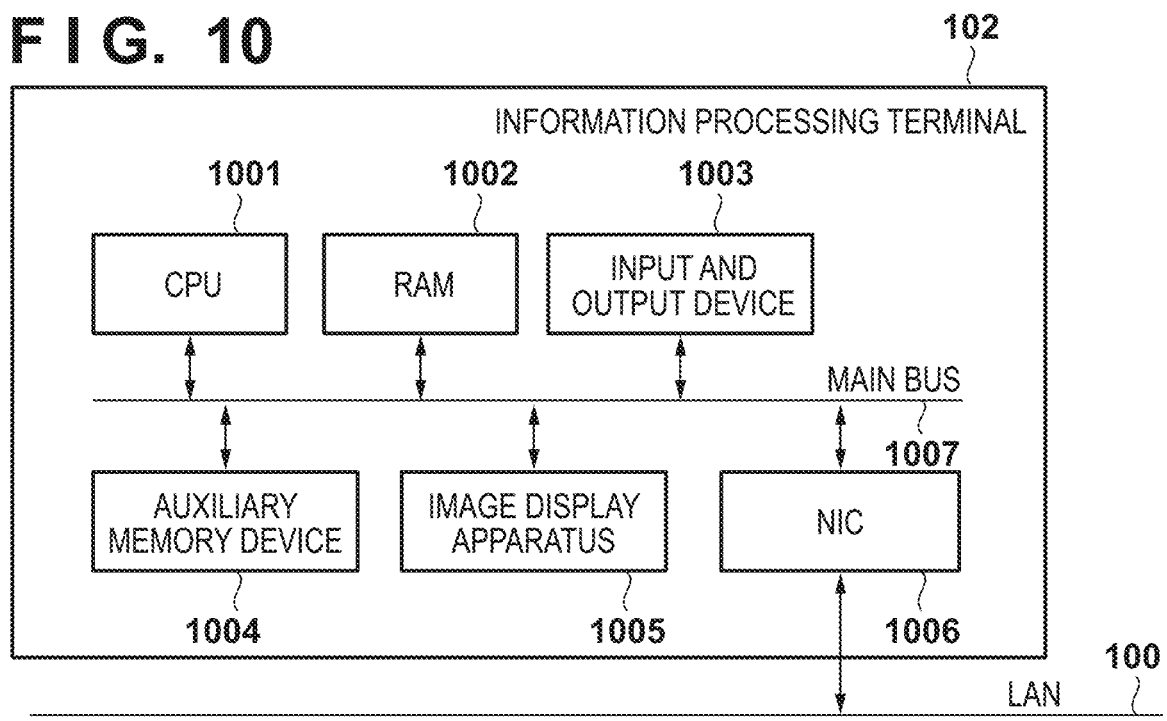
FIG. 10 is a block diagram for describing a hardware configuration of an information processing terminal.

FIG. 10 is one example of an internal configuration of a common information processing terminal, and shows an internal configuration of the information processing terminal 102 in FIG. 1. The information processing terminal 102 includes a CPU 1001, a RAM 1002, an auxiliary memory device 1004, an image display apparatus 1005, an input/output apparatus 1003, an NIC 1006, and a main bus 1007.

The CPU 1001 performs information processing when controlling the information processing terminal 102 of the present invention. The RAM 1002 is a memory in which a work area of the CPU 1001 is provided. The auxiliary memory device 1004 is a hard disk, a floppy disk, CD-ROM, or the like in which a control program in the present embodiment is provided. The auxiliary memory device 1004 stores various application programs, data, user information, device information, and the like, for example. Furthermore, it may also be used for temporary storage of data. The image display apparatus 1005, specifically, is a CRT display, a liquid crystal display, or the like used for the purpose of notifying the user of a message. The input apparatus 1003, specifically, is a mouse, keyboard, or the like for inputting a command of the user. The network interface card (NIC) 1006 exchanges data between other network devices via the LAN (100). These devices are connected by the main bus 1007.

Print Setting

Figure 11:
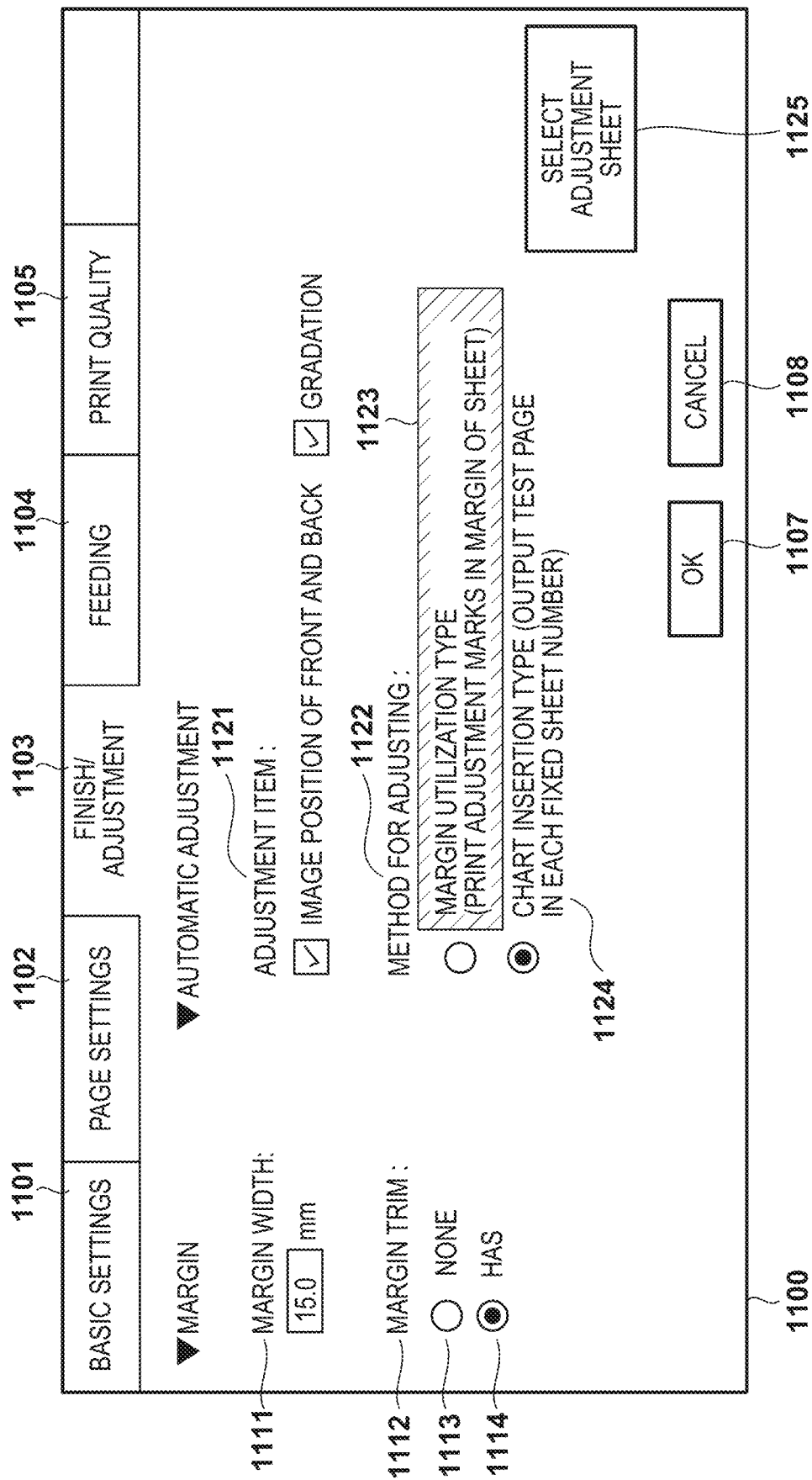
FIG. 11 is a view for illustrating an example of an information processing terminal screen.

FIG. 11 is one example of a print setting screen of a printer driver for a user to specify a print setting displayed on the image display apparatus 1005 of the information processing terminal 102. A print setting screen 1100 is configured by tabs 1101 to 1105. It is possible that a setting screen of any of the basic settings tab 1101, the page settings tab 1102, the finish/adjustment tab 1103, the feeding tab 1104, and the print quality tab 1105 is displayed.

FIG. 11 is one example of a setting screen of the finish/adjustment tab 1103. In the finish/adjustment tab 1103, a margin width 1111 is configured to input the margin width in the distance (in mm units) from the edge of the sheet.

A margin trim 1112 is a selection item for setting whether or not the margin region will be trimmed in the end. Either "yes" 1113 or "no" 1114 can be selected.

An adjustment item 1121 is a checkbox in which a type of adjustment to be executed can be selected. A checked adjustment item is executed. It becomes possible to independently select ON/OFF for "front and back image positions" and "gradation". In the adjustment executed using the inline sensor, there is a gradation correction (the "gradation" described above) for adjusting the image quality which is described in the present embodiment, and though omitted in the description of the present embodiment, there is a front and back registration adjustment ("the front and back image position adjustment" described above) for adjusting the position at which to form an image.

The adjustment method 1122 is configured to select either a margin utilization type 1123 or a chart insertion type 1124 as the method for adjusting the above adjustment items. Note, in a case where an adjustment by the margin utilization type in steps S1208 to S1210 of FIG. 12 described later is determined as impossible, the margin utilization type 1123 of the adjustment method 1122 is displayed as being grayed out. Also, selection cannot be performed and the setting is controlled so that it is invalidated. The control is described later.

Also, other tabs include the basic settings tab 1101, the page settings tab 1102, the feeding tab 1104, and the print quality tab 1105. The basic settings tab 1101 is configured by menus in which basic print settings such as the number of copies, printing direction, magnification, and output method are enabled. The page settings tab 1102 is configured by a menu or the like in which page layout and scaling of the output image are set. The finish tab 1103 is configured by a menu in which a setting of single-sided double-sided printing, a setting of binding direction, a setting of a discharge method, and the like are enabled. The feeding tab 1104 is configured by a menu for selecting which sheet feed tray sheet of the printing apparatus 101 will be used at a time of output. The print quality tab 1005 is configured by a menu in which image quality of the output image such as settings of the color mode (color/monochrome) or the resolution are set.

Then, when the user presses the OK button 1107 on a print setting specification screen 1100, the information processing terminal 102 generates a print job 900 (described later in FIG. 9) and transmits the print job 900 to the printing apparatus 101 via the LAN 100.

Configuration of the Print Job

Figure 9:
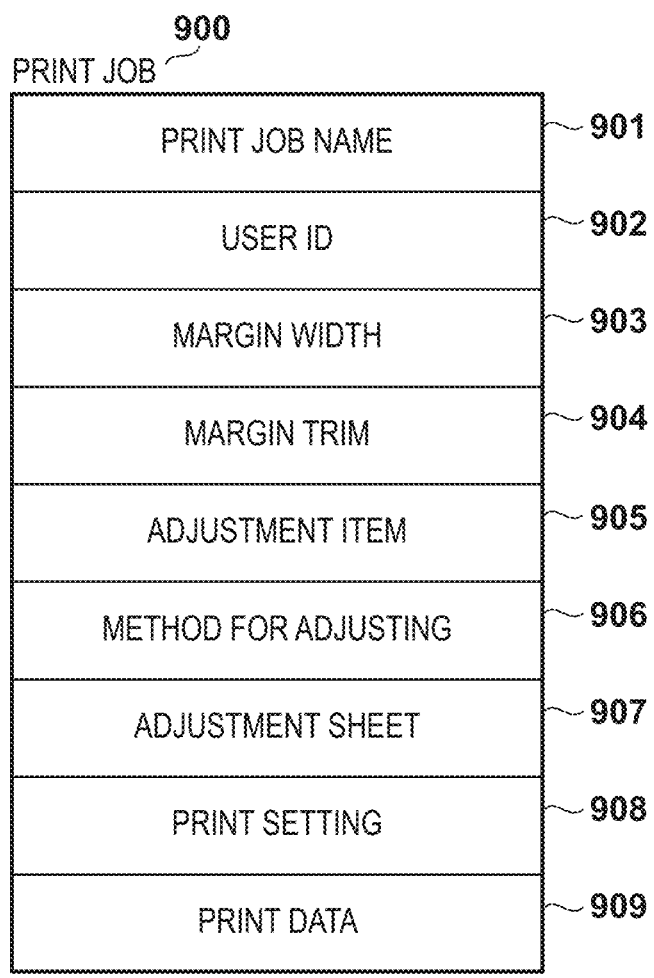
FIG. 9 is a view for illustrating a configuration example of a print job.

FIG. 9 is one example of a print job generated by the information processing terminal 102 in step S1212 and S1214 of FIG. 12 described later. A print job name 901 is identification information or an identifier of the print job. A user ID 902 is identification information for specifying the user using the information processing terminal 102. The user ID 902 may be in a form explicitly specified by the user in the print setting specification screen 1100. The margin width 903 is a value that the user specifies in the margin width 1111 of the print setting specification screen 1100. It is a numerical value in mm units. A margin trim 904 is a setting that the user specifies in the margin trim 1112 of the print setting specification screen 1100. "Trim margin" or "do not trim margin" are stored. An adjustment item 905 an adjustment item that the user specifies in the adjustment item 1121 of the print setting specification screen 1100. As set by the adjustment item 1121 of FIG. 11, any one of "front and back image positions and gradations", "front and back image positions only", "gradation only", and "none" is stored. An adjustment method 906 is an adjustment method that the user specifies in the adjustment method 1122 of the print setting specification screen 1100. "Margin utilization type" or "chart insertion type" are stored. For a sheet setting 907, a setting of sheet for adjustment is stored. In a case where the adjustment method 906 is margin utilization type, the contents or the item itself may be absent. In the case of the chart insertion type, the type of sheet type that the user specified is stored. A print setting 908 is a print setting such as the number of copies, staple setting, punch setting, feeding setting, resolution setting, and print color. Print data 909 is print data instructed from arbitrary drawing software such as a text editor. The printing apparatus 101 is described in a format that can be interpreted and executed.

Generation and Transmission of a Print Job

Figure 12:
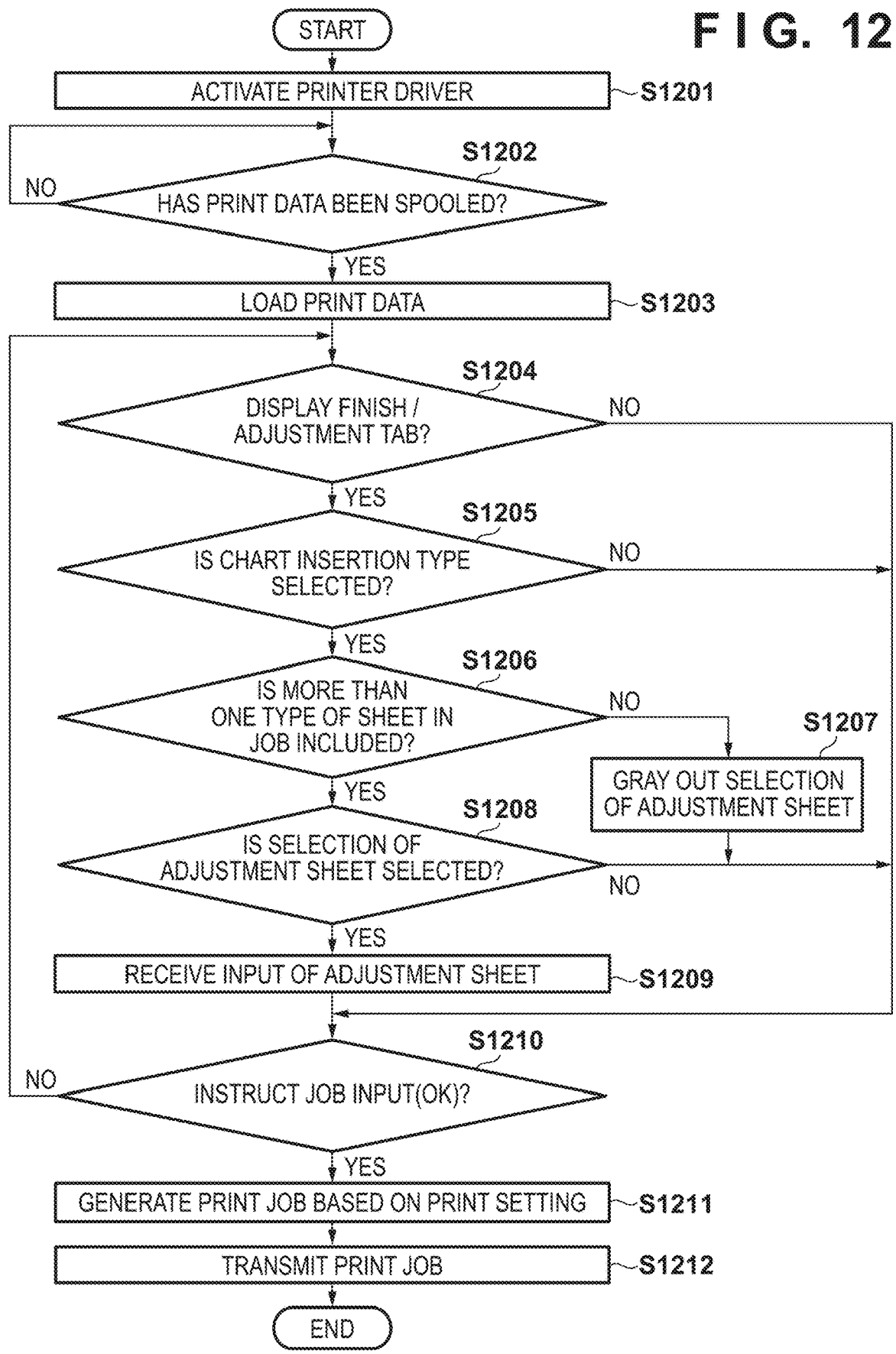
FIG. 12 is a flowchart of an information processing terminal (generation/transmission of a print job).

FIG. 12 is a flowchart illustrating generation and transmission processing of a print job in the information processing terminal 102. The processing of FIG. 12 is realized by, for example, the CPU 1001 of the information processing terminal 102 reading out to the RAM 1002 a program stored in the auxiliary memory device 1004 and executing it.

In step S1201, the CPU 1001 receives a print instruction from the user via the application and activates the printer driver. At that time, the CPU 1001 reads the initial values of various settings such as print settings and image processing settings stored in the auxiliary memory device 1004 and the like. Then, in accordance with an operation of the user, the CPU 1001 causes the image display apparatus 1005 to display the user interface screen of the printer driver as described in FIG. 11. Also, while switching to an appropriate screen according to the user operation, the setting of the user is received.

In step S1202, the CPU 1001 determines whether or not every page of the print data has been spooled. Here, in a case where it is determined that spooling is not complete, the CPU 1001 returns to step S1202 and repeats the processing until spooling is complete. On the other hand, in a case where it is determined that spooling is complete in step S1202, the CPU 1001 loads the print data in step S1203.

Then, in step S1204, the CPU 1001 determines whether or not the finish/adjustment tab 1103 is displayed. Here, in a case where it is determined that the correction tab 1006 is displayed, the CPU 1001 determines whether the chart insertion type is selected for the adjustment method in step S1205. Also, as a result of the determination in step S1205, in a case where it is determined that the chart insertion type is selected, it is determined whether or not a specification of a plurality of sheet types is included with the job in step S1206. In a case where it is determined in step S1206 that the job includes the specification of a plurality of types of sheets, the CPU 1001 determines whether or not "selection of adjustment sheet" is selected in step S1208. On the other hand, in a case where it is determined that a only single sheet type is included in the job in step S1206, the CPU 1001 grays out the selection button of adjustment sheet on the UI in step S1207.

Figure 13:
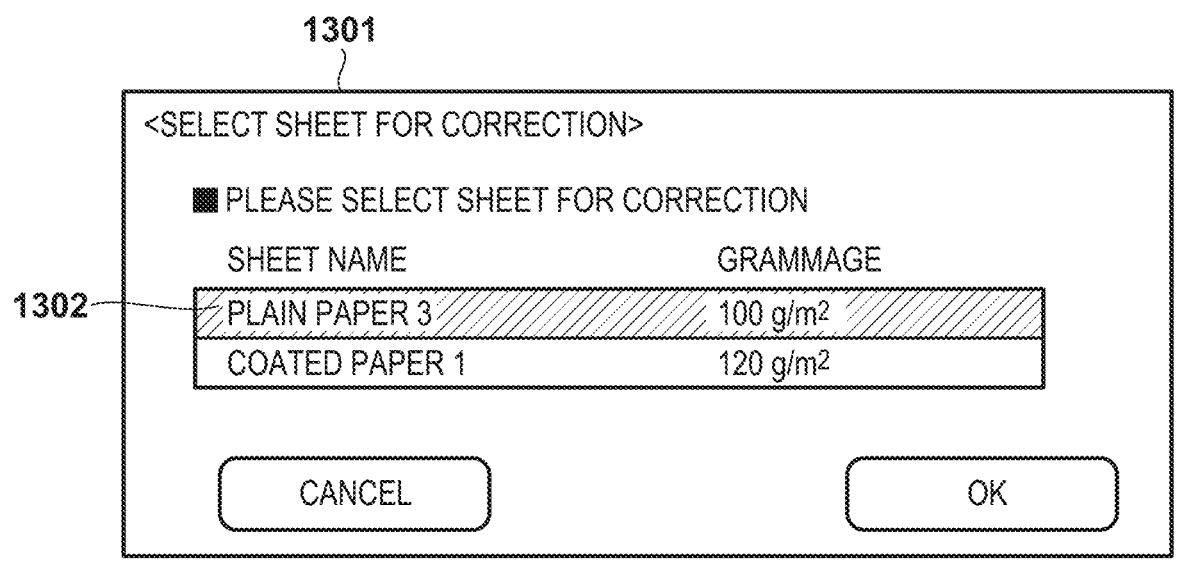
FIG. 13 is a view for illustrating an example of a sheet selection for adjustment UI in the information processing terminal.

As a result of the determination in step S1208, in a case where it is determined that "selection of adjustment sheet" is selected, the UI example illustrated in FIG. 13 is displayed and the selection of the adjustment sheet is received in step S1209. Note, the title "sheet for correction" displayed in FIG. 13 refers to the adjustment sheet. A sheet selection UI 1301 displays a list of sheet types included in the job (that is, specified in the job). The user selects the sheet to be used for the adjustment from the list as shown in a highlighted portion 1302. With the selected sheet type, the processing then advances to step S1210. On the other hand, in a case where it is determined that the correction tab 1006 is not displayed in step S1204, the CPU 1001 advances the processing to step S1210. Also, in a case where it is determined that the chart insertion type is not selected in step S1205 or in a case where it is determined that a selection of adjustment sheet is not selected in step S1208, the CPU 1001 advances the processing to step S1210.

In step S1210, the CPU 1001 determines whether or not the OK button 1107 was pressed. Here, in a case where it is determined that the OK button 1107 was not pressed, the CPU 1001 returns to step S1204 and repeats the processing.

On the other hand, in a case where it is determined that the OK button 1107 was pressed in step S1208, the CPU 1001, in step S1211, receives a print instruction notified via the OS from the application and performs generation of the print job 900 in accordance with each type of print setting set for the user until now. Here, it is assumed that information such as user information or job name is set in the generated print job 900. Furthermore, information such as margin width, margin trim, adjustment item, and adjustment method are set. Then, in step S1212, the CPU 1001 transmits the print job 900 generated in the image forming apparatus 101 via the LAN 100 and ends the present processing.

Accordingly, the generated print job 900 is transmitted to the print job generating unit 301 of the printing apparatus 101 and the print job in the printing apparatus 101 is generated. The print job generated by the printing apparatus 101 may be in the same format as the printing job 900, but may be in the internal format of the printing apparatus 101.

According to the embodiment described above, the adjustment sheet can be selected, and the chart for correction can be printed on the selected adjustment sheet (selected type of sheet). Accordingly, gradation correction suitable for the selected type of sheet and high quality image formation become possible.

Note, although the adjustment sheet is specified by the user, for example, the priority of the adjustment sheet may be determined in advance, and the sheet type having the highest priority among the sheet types used in the job may be used as the adjustment sheet. Also, in the present embodiment, the type of sheet that is specified as the condition for which it is set that printing of a predetermined number of sheets be performed is fed, and a chart for gradation correction is printed at the point. In contrast to this, the conditions that trigger printing may be changed to something else.

Second Embodiment

In the present embodiment, if the number of printed pages reaches a predetermined number (predetermined threshold) during the execution of the print job, and there remains printing to the specified type of sheet to do in the currently executing job, the color chart is printed on the specified type of sheet.

Figure 17:
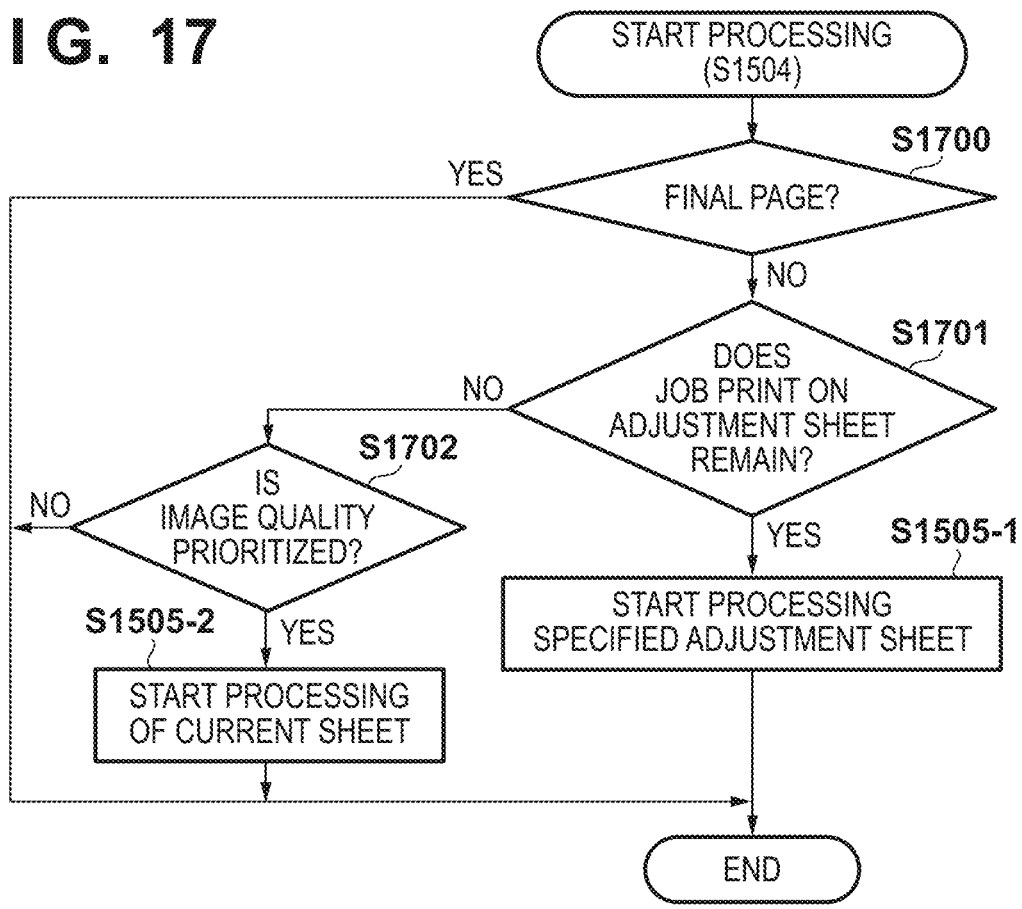
FIG. 17 is a flowchart of a chart print necessity check of a second embodiment.

This embodiment is common to the first embodiment except that the procedure of step S1504 in FIG. 15 is changed to the procedure as shown in FIG. 17. Thus, FIG. 17 will be described and the others are omitted. The job control unit 303 firstly determines whether the last discharged sheet is the final page (step S1700). This determination is the same as step S1422 and may be performed in combination with step S1422. Next, it is determined whether there remains printing on the type of sheet specified as the adjustment sheet in the print job executing in FIG. 14 (step S1701). If printing remains, processing for printing the chart on the specified adjustment sheet starts (step S1505-1). Step S1505-1 corresponds to the processing performed in step S1505 of FIG. 15. On the other hand, in a case where it is determined that there is no printing remaining, it is determined whether the image quality is prioritized (step S1702). Image quality priority may be set in a part of the procedure of FIG. 12, for example. If image quality is prioritized, processing for printing the chart on the current sheet, specifically the sheet being currently supplied rather than switching the sheet feed tray, starts (step S1505-2). Step S1505-2 corresponds to the processing performed in step S1505 of FIG. 15. In this case, an update of the correction information corresponding to the type of sheet currently used, which is not the type specified as the adjustment sheet, is attempted. If image quality is not prioritized, the processing ends as is.

In this way, in addition to being able to update the correction information corresponding to the type of print medium specified as the adjustment sheet, it is also possible to update the corresponding correction information for the type of print medium not specified. In addition, the update of the correction information corresponding to the type of print medium specified as the adjustment sheet is not prevented.

Third Embodiment

In the present embodiment, even if the number of printed pages reaches a predetermined number during the execution of the print job, if the printing on the specified type of sheet is not performed, printing of the color chart is delayed until the printing on the specified type of sheet is performed in the executing print job. Similar to the second embodiment, the differences from the first embodiment are described here.

Figure 18:
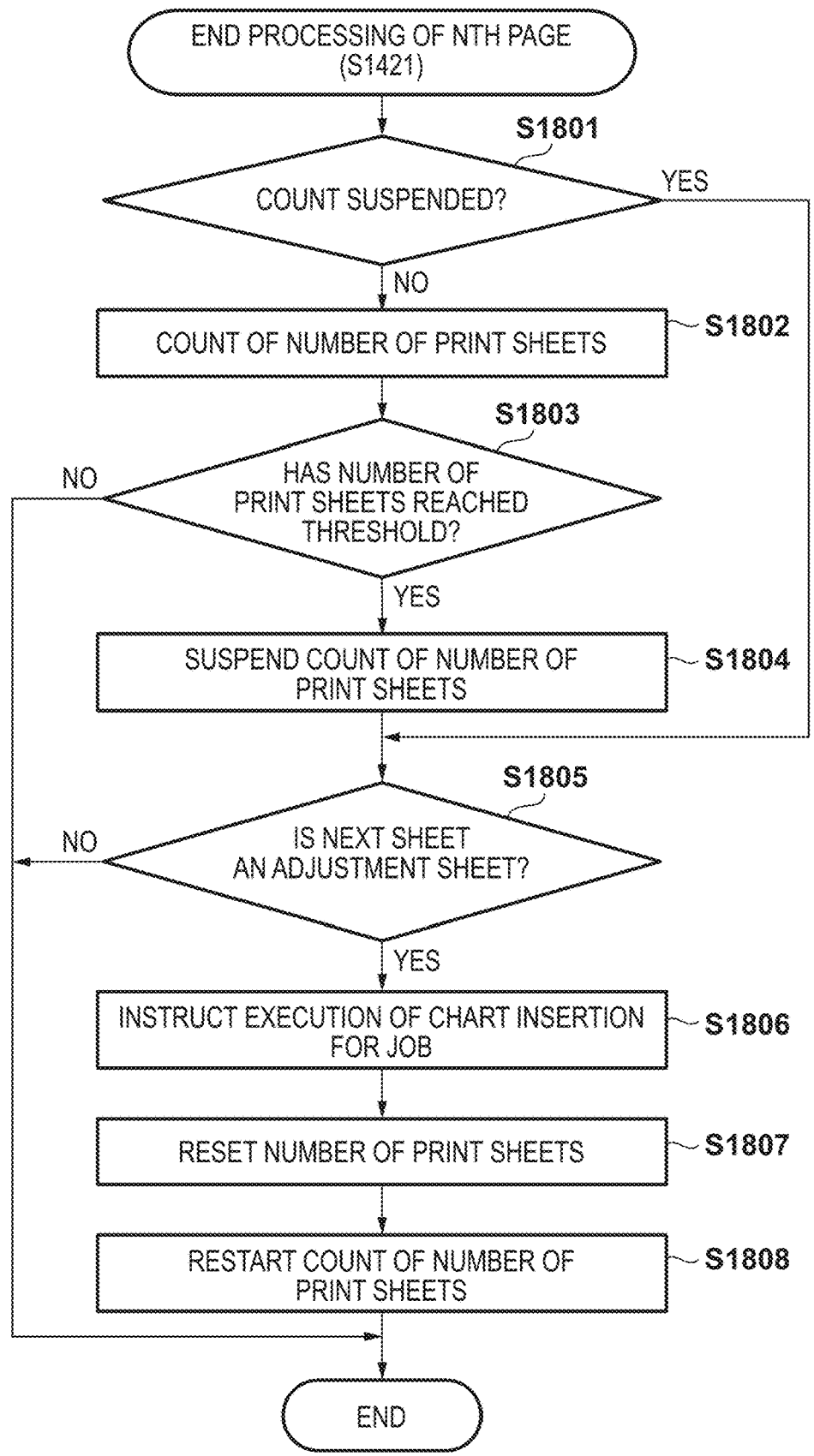
FIG. 18 is a flowchart of a chart print necessity check of a third embodiment.

A flowchart of the processing of the third embodiment is illustrated in FIG. 18. FIG. 18 is a procedure executed by the job control unit 303 in accordance with reception of a notification of the page processing end in step S1421 of FIG. 14, for example. Also, in the present embodiment, a count up of the number of printed sheets performed in step S1419 of FIG. 14 is assumed to be performed by the job control unit 303.

Firstly, it is determined whether the count up of the number of printed sheets is suspended (step S1801). Suspension of the count is performed in the subsequent step S1804. If suspended, the count of the number of printed sheets is performed (step S1802). Then, it is determined whether the number of printed sheets reached a threshold (step S1803), and if reached, the count of the number of printed sheets is suspended (step S1804). In step S1801, in a case where it is determined that the count is not suspended, step S1805 is diverted to.

Next, in step S1805, it is determined whether the next sheet is the type of sheet specified as the adjustment sheet. If so, an execution instruction of a job for chart insertion is outputted to the print job generating unit 301 (step S1806), the number of printed sheets is reset (step S1807), and the count of number of printed sheets restarts (step S1808). After this, the processing connects to the processing from step S1503 of FIG. 15. Also, in a case where the number of printed sheets does not reach the threshold in step S1803, or in a case where the next sheet is not the adjustment sheet in step S1805, the processing ends. In such a case, if the printing of the final page is not completed, the loop from step S1403 continues, and if completed, the job ends.

By the above procedure, even when the printing of the predetermined number of pages is completed, the printing of the chart for gradation correction is delayed until the printing on the specified adjustment sheet is completed. As a result, the waiting time (delay) caused by the switching of sheets can be avoided, and the quality of the image formed on the specified print medium can be improved without lowering productivity.

Other Embodiments

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2020-136729, filed Aug. 13, 2020 which is hereby incorporated by reference herein in its entirety.

What is claimed is:

1. An image forming apparatus that prints a print job including at least two different types of sheets of a plurality of sheets, comprising:
a sheet feeding unit configured to supply the plurality of types of sheets;
an image forming unit configured to form an image on a sheet supplied by the sheet feeding unit;
a detection unit configured to detect an image formed on the sheet; and
a controller including at least one memory in which a program is stored and at least one processor, wherein, by the program being executed by the processor, the controller is configured to:
cause correction information for each sheet type of the plurality of types of sheets to be saved in a storage;
when a first sheet type of the at least two different types of sheets is supplied by the sheet feeding unit, cause a first chart for gradation correction to be formed by the image forming unit, cause the correction information for the first sheet type to be generated based on image information for which the formed first chart for gradation correction was detected by the detection unit, and save the correction information for the first sheet type in the storage; and when a second sheet type of the at least two different types of sheets is supplied by the sheet feeding unit, cause a second chart for gradation correction to be formed by the image forming unit, cause the correction information for the second sheet type to be generated based on image information for which the formed second chart for gradation correction was detected by the detection unit, and save the correction information for the second sheet type in the storage.

2. The image forming apparatus according to claim 1, wherein the controller is further configured to:

cause the print job to be received, the print job specifying a type of sheet to be used when a chart for gradation correction is formed;

cause the type of sheet specified in the print job to be supplied by the sheet feeding unit;

cause a chart for gradation correction to be formed by the image forming unit;

cause the correction information to be generated based on image information for which the formed chart for gradation correction was detected by the detection unit; and save the correction information in the storage.

3. The image forming apparatus according to claim 1, wherein the controller is further configured to cause a type of sheet specified for each number of printed pages that reach a predetermined threshold to be supplied by the sheet feeding unit, and cause the chart for gradation correction to be formed by the image forming unit.

4. The image forming apparatus according to claim 1, wherein when a number of printed pages of a specified type of sheet reaches a predetermined threshold and there are additional pages of the specified type of sheet to be printed in the print job, the controller is further configured to cause the specified type of sheet to be supplied by the sheet feeding unit, and cause the chart for gradation correction to be formed by the image forming unit.

5. The image forming apparatus according to claim 1, wherein when a number of printed pages reaches a predetermined threshold, there are additional pages of a type of sheet to be printed in the print job, and image quality prioritization is designated, the controller is further configured to cause the chart for gradation correction to be formed by the image forming unit on the type of sheet currently being supplied.

6. The image forming apparatus according to claim 1, wherein when a number of printed pages reaches a predetermined threshold and printing to a specified type of sheet is to be performed according to the print job, the controller is further configured to cause the specified type of sheet to be supplied by the sheet feeding unit, and cause the chart for gradation correction to be formed by the image forming unit.

7. The image forming apparatus according to claim 1, wherein the controller is further configured to generate a difference between reference information saved in advance and the image information detected by the detection unit as the correction information for each type of sheet.

8. The image forming apparatus according to claim 1, wherein in a case where there is no reference information, the controller saves the image information detected by the detection unit as the reference information.

9. The image forming apparatus according to claim 1, wherein in a case where an interrupt mode is specified, the controller is further configured to form the chart for gradation correction on a specified type of sheet, and in a case where a margin utilization mode is specified, the controller is further configured to cause the chart for gradation correction to be formed by the image forming unit in a margin of an image to be printed.

10. A non-transitory computer readable storage medium configured to store program that, when executed by a processor, causes a control method of an image forming apparatus that prints a print job including at least two different types of sheets of a plurality of sheets to be executed, wherein the image forming apparatus comprises:
a sheet feeding unit configured to supply the plurality of types of sheets;
an image forming unit configured to form an image on a sheet supplied by the sheet feeding unit;
a detection unit configured to detect an image formed on the sheet; and
the processor configured to cause correction information for each sheet type of the plurality of types of sheets to be saved in a storage, and wherein the control method comprises:
when a first sheet type of the at least two different types of sheets is supplied by the sheet feeding unit, causing a first chart for gradation correction to be formed by the image forming unit, generating the correction information for the first sheet type based on image information for which the formed first chart for gradation correction was detected by the detection unit, and saving the correction information for the first sheet type in the storage; and when a second sheet type of the at least two different types of sheets is supplied by the sheet feeding unit, causing a second chart for gradation correction to be formed by the image forming unit, generating the correction information for the second sheet type based on image information for which the formed second chart for gradation correction was detected by the detection unit, and saving the correction information for the second sheet type in the storage.

11. A method of controlling an image forming apparatus that prints a print job including at least two different types of sheets of a plurality of sheets and comprises a sheet feeding unit configured to supply the plurality of types of sheets, an image forming unit configured to form an image on a sheet supplied by the sheet feeding unit, a detection unit configured to detect an image formed on the sheet, and a controller configured to cause correction information for each sheet type of the plurality of types of sheets to be saved in a storage, the method comprising:

when a first sheet type of the at least two different types of sheets is supplied by the sheet feeding unit, causing a first chart for gradation correction to be formed by the image forming unit, generating the correction information for the first sheet type based on image information for which the formed first chart for gradation correction was detected by the detection unit, and saving the correction information for the first sheet type in the storage; and when a second sheet type of the at least two different types of sheets is supplied by the sheet feeding unit, causing a second chart for gradation correction to be formed by the image forming unit, generating the correction information for the second sheet type based on image information for which the formed second chart for gradation correction was detected by the detection unit, and saving the correction information for the second sheet type in the storage.

12. The method of controlling the image forming apparatus according to claim 11, further comprising:
   receiving the print job, wherein a type of sheet to be used when a chart for gradation correction is formed is specified in the print job;
   supplying the specified type of sheet of the print job by the sheet feeding unit;
   causing a chart for gradation correction to be formed by the image forming unit;
   causing the correction information to be generated based on image information for which the formed chart for gradation correction was detected by the detection unit; and
   saving the correction information in the storage.

13. The method of controlling the image forming apparatus according to claim 11, further comprising causing the type of sheet specified for each number of printed pages that reach a predetermined threshold to be supplied by the sheet feeding unit, and causing the chart for gradation correction to be formed by the image forming unit.

14. The method of controlling the image forming apparatus according to claim 11, wherein when a number of printed pages of a specified type of sheet reaches a predetermined threshold and there are additional pages of the specified type of sheet to be printed in the print job, the specified type of sheet is caused to be supplied by the sheet feeding unit, and the chart for gradation correction is caused to be formed by the image forming unit.

15. The method of controlling the image forming apparatus according to claim 11, wherein when a number of printed pages reaches a predetermined threshold, there are additional pages of a type of sheet to be printed in the print job, and image quality prioritization is designated, the chart for gradation correction is caused to be formed by the image forming unit on the type of sheet currently being supplied.

16. The method of controlling the image forming apparatus according to claim 11, wherein when a number of printed pages reaches a predetermined threshold and printing to a specified type of sheet is to be performed according to the print job, the specified type of sheet is caused to be supplied by the sheet feeding unit, and the chart for gradation correction is caused to be formed by the image forming unit.

* * * * *